(12) United States Patent
Kanazaki et al.

(10) Patent No.: US 12,479,991 B2
(45) Date of Patent: Nov. 25, 2025

(54) PARTICLE AND METHOD FOR PRODUCING PARTICLE

(71) Applicant: CANON KABUSHIKI KAISHA, Tokyo (JP)

(72) Inventors: Kengo Kanazaki, Kanagawa (JP); Fumio Yamauchi, Kanagawa (JP); Motokazu Kobayashi, Kanagawa (JP); Norishige Kakegawa, Tokyo (JP); Ryo Natori, Tokyo (JP); Tetsushi Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 17/714,402

(22) Filed: Apr. 6, 2022

(65) Prior Publication Data

US 2022/0227984 A1  Jul. 21, 2022

Related U.S. Application Data

(63) Continuation of application No. PCT/JP2020/038636, filed on Oct. 13, 2020.

(30) Foreign Application Priority Data

Oct. 15, 2019 (JP) .................... 2019-188848

(51) Int. Cl.
  *C08L 25/14* (2006.01)
  *C08F 212/08* (2006.01)
  *G01N 33/545* (2006.01)

(52) U.S. Cl.
  CPC .......... *C08L 25/14* (2013.01); *C08F 212/08* (2013.01); *G01N 33/545* (2013.01)

(58) Field of Classification Search
  CPC .............................. C08G 212/08; C08L 25/14
  USPC ........................................................ 526/279
  See application file for complete search history.

(56) References Cited

U.S. PATENT DOCUMENTS

| 8,846,810 | B2 | 9/2014 | Mase et al. |
| 10,214,650 | B2 * | 2/2019 | Yamauchi ............... C09D 7/62 |
| 2011/0218301 | A1 | 9/2011 | Nemoto et al. |
| 2014/0371420 | A1 | 12/2014 | Mase et al. |
| 2021/0101130 | A1 | 4/2021 | Suda et al. |

FOREIGN PATENT DOCUMENTS

| CN | 101649014 A | 2/2010 |
| CN | 103242515 A | 8/2013 |
| CN | 105873960 A | 8/2016 |
| JP | 4-175351 A | 6/1992 |
| JP | 9-31343 A | 2/1997 |
| JP | 10-330488 A | 12/1998 |
| JP | 2004-151000 A | 5/2004 |
| WO | 2019/208669 A1 | 10/2019 |
| WO | 2019/208670 A1 | 10/2019 |
| WO | 2019/208672 A1 | 10/2019 |
| WO | 2019/208711 A1 | 10/2019 |
| WO | 2021/075426 A1 | 4/2021 |

OTHER PUBLICATIONS

First Office Action in Chinese Application No. 202080072543.8 (Feb. 2023).
International Preliminary Report on Patentability in International Application No. PCT/JP2020/038636 (Apr. 2022).
Extended European Search Report in European Application No. 20875869.8 (Sep. 2023).
International Search Report in International Application No. PCT/JP2020/038636 (Jan. 2021).

* cited by examiner

*Primary Examiner* — Margaret G Moore
(74) *Attorney, Agent, or Firm* — Venable LLP

(57) ABSTRACT

To provide a method for producing a particle that can suppress non-specific adsorption without using BSA. A method for producing a particle, including: a first step of mixing a radically polymerizable monomer, an organic silane compound having a silicon atom to which an alkoxy group is bonded and having radical polymerizability, a radical polymerization initiator, a water-soluble polymer, and an aqueous medium to prepare an emulsion; and a second step of adding a specific reactive compound after the first step.

3 Claims, No Drawings

PARTICLE AND METHOD FOR PRODUCING PARTICLE

CROSS-REFERENCE TO RELATED APPLICATIONS

This application is a Continuation of International Patent Application No. PCT/JP2020/38636, filed Oct. 13, 2020, which claims the benefit of Japanese Patent Application No. 2019-188848, filed Oct. 15, 2019, both of which are hereby incorporated by reference herein in their entirety.

BACKGROUND OF THE INVENTION

Field of the Invention

The present invention relates to a particle and a method for producing a particle.

Description of the Related Art

A polymer particle is becoming more important in the fields of basic biology and medicine. For example, there is an increasing need for application to an in-vitro laboratory diagnostic agent using a latex agglutination method.

In principle, if a desired antigen or antibody can be adsorbed on the particle surface, it can be used for a latex agglutination reaction. However, many contaminants are present in a specimen such as serum, and these contaminants are also adsorbed on the particle surface (non-specific adsorption) and inhibit the adsorption of a desired antigen or antibody on the particle surface. In addition, when the particles agglutinate with each other via the contaminants adsorbed on the particles, the measurement accuracy decreases. For this reason, there is a method for suppressing the adsorption (non-specific adsorption) of a contaminant on the particle surface by adsorbing a desired antibody on a particle and then covering the particle surface with bovine serum albumin (BSA). (Japanese Patent Application Laid-Open No. 2004-151000).

For example, for the method for covering the particle surface with BSA as described in Japanese Patent Application Laid-Open No. 2004-151000, the adsorption of a contaminant may or may not be sufficiently suppressed. For this reason, when a particle covered with BSA is used in a latex agglutination method, a problem is that the reproducibility decreases.

Therefore, an object of the present invention is to provide a particle that can suppress non-specific adsorption without using BSA and a method for producing the same.

SUMMARY OF THE INVENTION

The method for producing a particle according to one aspect of the present invention is a method for producing a particle, including: a first step of mixing a radically polymerizable monomer, an organic silane compound having a silicon atom to which an alkoxy group is bonded and having radical polymerizability, a radical polymerization initiator, a water-soluble polymer, and an aqueous medium to prepare an emulsion; and a second step of adding a reactive compound after the first step, wherein the reactive compound is represented by the following formula (1):

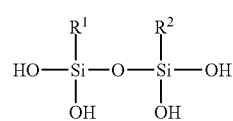

(1)

In formula (1), $R^1$ and $R^2$ each represent a linear or branched alkyl group having 1 or more and 30 or less carbon atoms that optionally includes —NH—CO—, —NH—, —O—, —S—, or —CO— substituted with at least one carboxy group or at least one amino group.

In addition, a particle according to another aspect of the present invention is a particle produced by: a first step of mixing a radically polymerizable monomer, an organic silane compound having a silicon atom to which an alkoxy group is bonded and having radical polymerizability, a radical polymerization initiator, a water-soluble polymer, and an aqueous medium to prepare an emulsion; and a second step of adding a reactive compound after the first step, wherein the reactive compound is represented by the above formula (1).

Further features of the present invention will become apparent from the following description of exemplary embodiments.

DESCRIPTION OF THE EMBODIMENTS (Particle and Method for Producing Particle)

The method for producing a particle according to the present embodiment includes: a first step of mixing a radically polymerizable monomer, an organic silane compound having a silicon atom to which an alkoxy group is bonded and having radical polymerizability, a radical polymerization initiator, a water-soluble polymer, and an aqueous medium to prepare an emulsion; and a second step of adding a reactive compound after the first step, wherein the reactive compound is represented by the following formula (1):

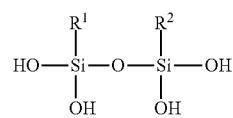

(1)

In formula (1), $R^1$ and $R^2$ each represent a linear or branched alkyl group having 1 or more and 30 or less carbon atoms that optionally includes —NH—CO—, —NH—, —O—, —S—, or —CO— substituted with at least one carboxy group or at least one amino group.

In the following, the particle produced by the production method according to the present embodiment may be referred to as a polymer fine particle. The particle produced by the method for producing a particle according to the present embodiment has high hydrophilicity on the particle surface due to the presence of silica (silanol group) derived from the organic silane compound, and thus can suppress non-specific adsorption without using BSA. In addition, BSA is a natural product, and thus it is presumed that the degrees of hydrophilicity and hydrophobicity differ depending on the lot, but the particle produced by the method for producing a particle according to the present embodiment does not use BSA, and thus the difference in the ability to suppress non-specific adsorption for each particle is small.

In other words, in producing a particle, the reproducibility of the ability of the produced particle to suppress non-specific adsorption is high.

The addition of a reactive compound as the second step after the first step has the following advantages. First, the effect of improvement in the uniformity of the core of the particle prepared in the first step can be expected. In addition, the effect of improvement in the reactivity of the reactive compound on the surface of the particle obtained through the first step can be expected.

In the second step, one or more surfactants may be added. The dispersibility of the polymer fine particle can be improved by adding a surfactant.

At least any of $R^1$ and $R^2$ in the formula (1) preferably has at least one carboxy group.

In addition, the method for producing a particle according to the present embodiment preferably further includes heating the emulsion after the first step.

In the first step, a monomer having two or more double bonds in one molecule, for example, divinylbenzene may be further used as a cross-linking agent.

At least one of $R^1$ and $R^2$ in the formula (1) preferably has a structure represented by the following formula (2) or a structure represented by the formula (3).

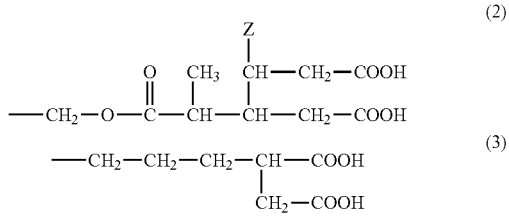

In formula (2), Z represents a linear or branched, saturated or unsaturated alkyl group having 1 or more and 10 or less carbon atoms.

In addition, a particle according to the present embodiment is a particle produced by: a first step of mixing a radically polymerizable monomer, an organic silane compound having a silicon atom to which an alkoxy group is bonded and having radical polymerizability, a radical polymerization initiator, a water-soluble polymer, and an aqueous medium to prepare an emulsion (mixture); and a second step of adding a reactive compound after the first step, wherein the reactive compound is represented by the above formula (1).

The particle according to the present embodiment is a particle produced by the above method for producing a particle according to the present embodiment. That is, the particle according to the present embodiment preferably has one or more structural units represented by the following formula (4).

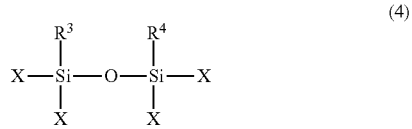

In formula (4), X represents a bond with Si which adjacent structures via O represented by formula (4) have, a bond with a core of the particle prepared from the emulsion, or a hydroxy group, and at least one of the structural units represented by formula (4) has a bond with the core.

At least any one of $R^3$ and $R^4$ represents a linear or branched alkyl group having 1 or more and 30 or less carbon atoms that optionally includes —NH—CO—, —NH—, —O—, —S—, or —CO— substituted with at least one carboxy group or at least one amino group.

In addition, at least one of $R^3$ and $R^4$ in the formula (4) preferably has a structure represented by the above formula (2) or a structure represented by the above formula (3), and at least one of $R^3$ and $R^4$ more preferably has a structure represented by the above formula (3).

(Radically Polymerizable Monomer)

As the radically polymerizable monomer, a monomer including no silicon atom can be used.

In addition, as the radically polymerizable monomer, at least one selected from the group consisting of a styrene-based monomer, an acrylate-based monomer, and a methacrylate-based monomer can be used. Specifically, as the radically polymerizable monomer, at least one selected from the group consisting of, for example, styrene, butadiene, vinyl acetate, vinyl chloride, acrylonitrile, methyl methacrylate, methacrylonitrile, and methyl acrylate can be used. That is, these can be used singly or in combinations of two or more.

Further, as the radically polymerizable monomer according to the present embodiment, monomers having a high compatibility with each of the styrene-based monomer, the acrylate-based monomer, and the methacrylate-based monomer and having a functional group having high hydrophilicity, can be used singly or in combinations of two or more. For example, a styrenesulfonic acid-based monomer having a sulfonic acid group (sodium parastyrenesulfonate or the like) can be used as a functional group having high compatibility with styrene and high hydrophilicity.

In the first step of the method for producing a particle according to the present embodiment, the effects of reducing the particle size of the particle and increasing the uniformity of the particle size can be obtained by further mixing a parastyrenesulfonate to prepare the emulsion. One factor for this is that parastyrenesulfonic acid is also copolymerized during the polymerization reaction of the radically polymerizable monomer and the organic silane compound, and the hydrophilicity and dispersibility of the particle are improved.

(Organic Silane Compound)

As the organic silane compound, at least one selected from the group consisting of vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane can be used. That is, these may be used singly or in combinations of two or more.

(Radical Polymerization Initiator)

As the radical polymerization initiator, an azo compound, an organic peroxide, and the like can be widely used. Specific examples thereof include 2,2'-azobis(isobutyronitrile), 2,2'-azobis(2,4-dimethylvaleronitrile), 2,2'-azobis(2-methylbutyronitrile), 4,4'-azobis(4-cyanovaleric acid), 2,2'-azobis(2-methylpropionamidine) dihydrochloride, dimethyl 2,2'-azobis(2-methylpropionate), tert-butylhydroperoxide, benzoyl peroxide, ammonium persulfate (APS), sodium persulfate (NPS), and potassium persulfate (KPS).

(Water-Soluble Polymer)

The water-soluble polymer acts as a protective colloid during the synthesis of the polymer fine particle and contributes to controlling the particle size of the polymer fine particle generated. As a preferable water-soluble polymer, at least one selected from the group consisting of polyacrylamide, polyvinyl alcohol, polyethylene oxide, polyvinylpyrrolidone (PVP), and a polyvinylpyrrolidone-polyacrylic acid copolymer can be used. That is, one or a combination of a plurality of types of these may be used. The polyvinylpyrrolidone-polyacrylic acid copolymer is an example of a polymer containing a pyrrolidone ring and a functional group that can bind a ligand, and as the water-soluble polymer, a copolymer containing a pyrrolidone ring and a functional group that can bind a ligand may be used.

The molecular weight of the water-soluble polymer is preferably 10000 or more and 1000000 or less, and more preferably 30000 or more and 70000 or less. This is because if the molecular weight is 10000 or more, the effect as a protective colloid can be highly obtained, and if the molecular weight is 1000000 or less, the viscosity of the aqueous medium does not increase and the water-soluble polymer does not become difficult to handle. In addition, a part of these water-soluble polymers may be in close contact with the surface of the particle after synthesis by physical adsorption, chemical adsorption, or the like.

Hereinafter, a copolymer containing a pyrrolidone ring and a functional group that can bind a ligand is abbreviated as a PVP copolymer. In the PVP copolymer, the molar ratio of a site having a pyrrolidone ring to a site having a functional group that can bind a ligand is preferably about 2:8 to 9:1. If there are too few functional groups that can bind a ligand such as an antibody, the efficiency of the antigen-antibody reaction decreases, and if there are too many, the non-specific adsorption suppressing performance decreases. The functional group that can bind a ligand in the PVP copolymer is not particularly limited as long as the functional group is a functional group that can bind an antibody, an antigen, an enzyme, or the like, and a carboxy group, an amino group, a thiol group, an epoxy group, a maleimide group, a succinimidyl group, a silicon alkoxide group, and the like are used. The PVP copolymer may be a random polymer or a block copolymer.

By adding the PVP copolymer at the time of particle synthesis, a non-specific adsorption suppressing ability and a ligand binding ability can be imparted to the particle at once. Further, when a particle is synthesized using a radically polymerizable monomer (or oligomer) including an organic silane, a silanol group can be imparted to the surface of the particle. The hydrogen bond between the silanol group and PVP allows the PVP or the PVP copolymer to be more strongly adsorbed on the particle surface.

Examples of the polyvinylpyrrolidone-polyacrylic acid copolymer, which is an example of a PVP polymer, include a random copolymer of N-vinyl-2-pyrrolidone and acrylic acid (manufactured by Polymer Source, Inc.). As the random copolymer of N-vinyl-2-pyrrolidone and acrylic acid (manufactured by Polymer Source, Inc.), a preferable one can be selected from the group consisting of ones having molecular weights of 60000, 70000, 79000, and the like. In addition, similarly, as the ratio of the number of molecules of N-vinyl-2-pyrrolidone: the number of molecules of acrylic acid, a preferable one can be selected from the group consisting of 4:6, 3.1:6.9, 2:8, and the like.

(Aqueous Medium)

The water content of the aqueous medium is preferably 80% by mass or more and 100% by mass or less. Examples of the aqueous medium include water and a solution obtained by mixing an organic solvent soluble in water, for example, methanol, ethanol, isopropyl alcohol, or acetone, into water. If an organic solvent other than water is contained in an amount of more than 20% by mass, the polymerizable monomer may be dissolved during the production of the polymer fine particle.

In addition, the pH of the aqueous medium is preferably 6 or more and 9 or less. If the pH is 6 or more and 9 or less, the alkoxide group and the silanol group in the organic silane compound are not polycondensed and do not react with another functional group before the formation of the polymer fine particle, and there is no possibility that the obtained particle agglutinates. In the present embodiment, the alkoxide is not intentionally polycondensed before the formation of the polymer fine particle.

The pH of the aqueous medium is preferably adjusted using a pH buffer, and may be adjusted using an acid or a base.

A surfactant, an antifoaming agent, a salt, a thickening agent, or the like may be used by being added to the aqueous medium at a proportion of 10% by mass or less based on the aqueous medium.

(Surfactant)

As the surfactant added in the second step, a nonionic surfactant, an anionic surfactant, a cationic surfactant, a polymer surfactant, a phospholipid, or the like can be used. Only one of these surfactants may be used, or two or more of these surfactants may be used in combination.

Examples of the nonionic surfactant include a polyoxyethylene sorbitan-based fatty acid ester (for example, a compound represented by formula (5)), Brij (registered trademark) 35, Brij® 58, Brij® 76, Brij® 98, Triton® X-100, Triton® X-114, Triton® X-305, Triton® N-101, Nonidet® P-40, IGEPAL® CO530, IGEPAL® CO630, IGEPAL® CO720, and IGEPAL® CO730.

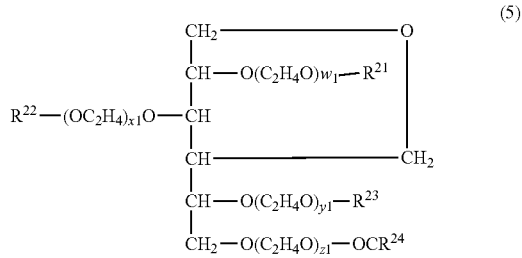

(5)

In formula (5), $R^{21}$ to $R^{24}$ are each independently selected from the group consisting of —H and —OCR'. The R' is a saturated or unsaturated alkyl group having 1 or more and 18 or less carbon atoms. In addition, in formula (5), w1, x1, y1, and z1 are integers in which the total sum of w1, x1, y1, and z1 is 10 or more and 30 or less.

Examples of the polyoxyethylene sorbitan fatty acid ester represented by formula (5) include Tween® 20, Tween® 40, Tween® 60, Tween® 80, and Tween® 85.

Examples of the anionic surfactant include sodium dodecyl sulfate, dodecylbenzene sulfonate, decylbenzene sulfonate, undecylbenzene sulfonate, tridecylbenzene sulfonate, nonylbenzene sulfonate, and sodium, potassium, and ammonium salts thereof.

Examples of the cationic surfactant include cetyltrimethylammonium bromide, hexadecylpyridinium chloride, dodecyltrimethylammonium chloride, and hexadecyltrimethylammonium chloride.

Examples of the polymer surfactant include polyvinyl alcohol, polyoxyethylene polyoxypropylene glycol, and gelatin. Examples of a commercially available product of polyoxyethylene polyoxypropylene glycol include Pluronic F68 (manufactured by BASF SE) and Pluronic F127 (manufactured by BASF SE).

Details of Method for Producing Particle According to the Present Embodiment

In the method for producing a particle according to the present embodiment, in the first step, the water-soluble polymer is first dissolved in an aqueous medium whose pH is adjusted to 6 or more and 9 or less. The water-soluble polymer concentration is 0.01% by mass or more and 20% by mass or less and preferably 0.03% by mass or more and 15% by mass or less based on the aqueous medium. If the water-soluble polymer concentration is 0.01% by mass or more, the effect of controlling the particle size can be sufficiently obtained. In addition, if the water-soluble polymer concentration is 20% by mass or less, the viscosity of the aqueous medium does not increase, and stirring can be sufficiently carried out.

Subsequently, a radically polymerizable monomer (A) including no silicon atom and an organic silane compound (B) having an alkoxy group bonded to a silicon atom and further having radical polymerizability are added to the aqueous medium to prepare an emulsion. The mass ratio of (A) and (B) is 4:6 to 9.7:0.3.

If the mass ratio of (A) to (B) is 4:6 or more, the specific gravity of the entire particle does not increase too much, and there is no possibility that the sedimentation of the particle becomes remarkable. In addition, if the mass ratio of (A) to (B) is 9.7:0.3 or less, the content of a silicon atom does not become too small, and there is no possibility that the ability to suppress non-specific adsorption decreases.

The ratio of the mass of the aqueous medium and the total mass of (A) and (B) is preferably 5:5 to 9.5:0.5. If the ratio of the mass of the aqueous medium to the total mass of (A) and (B) is 5:5 or more, there is no possibility that the agglutination of the polymer fine particle generated becomes remarkable. In addition, if the ratio of the mass of the aqueous medium to the total mass of (A) and (B) is 9.5:0.5 or less, there is no possibility that the amount generated decreases.

The reactive compound added in the second step can be used to immobilize an antibody.

The reactive compound can be used at a proportion of 0.01% by mass or more and 60% by mass or less based on the total mass of (A) and (B).

The radical polymerization initiator is used by being dissolved in water, a buffer, or the like. The radical polymerization initiator can be used at a proportion of 0.1% by mass or more and 10% by mass or less based on the total mass of (A) and (B).

When heating the emulsion after the first step is further included, any heating unit may be used for heating the emulsion as long as the entire emulsion is uniformly heated. The heating temperature can be arbitrarily set between 50° C. and 90° C., and the heating time can be arbitrarily set between 2 hours and 24 hours.

In the second step, the polymer fine particle obtained after the first step and the reactive compound are mixed and the entire liquid is uniformly stirred. The temperature at the time of stirring can be arbitrarily set between 4° C. and 90° C., and the stirring time can be arbitrarily set as long as it is 3 hours or more. The above surfactant may be added in the second step.

In the first step, a hybrid particle of a radically polymerizable monomer including no silicon atom, an organic silane compound having an alkoxy group bonded to a silicon atom and further having radical polymerizability, and a water-soluble polymer can be obtained. This hybrid particle has an advantage over a particle having a core-shell structure. Here, for example, a core particle of a particle having a core-shell structure is a polymer containing a monomer unit derived from a radically polymerizable monomer including no silicon atom. In addition, the shell of a particle having a core-shell structure is a polymer containing a monomer unit derived from an organic silane compound having an alkoxy group bonded to a silicon atom and further having radical polymerizability. The advantages of the hybrid particle over the core-shell structure include the following. As one advantage, in the production of the hybrid particle, raw materials can be added at once. That is, in the case of the core-shell structure, it is necessary to form a shell after forming a core, which complicates the production step. As another advantage, it is possible to change the reaction ratio (raw material input ratio) between the radically polymerizable monomer including no silicon atom and the organic silane compound having an alkoxy group bonded to a silicon atom and further having radical polymerizability. That is, the composition ratio of the polymer fine particle obtained can be easily controlled. The properties (specific gravity and the like) of the polymer fine particle thus obtained can be controlled.

The method for producing a particle according to the present embodiment may include adding a ligand after the second step.

The average particle size of the polymer fine particle is preferably 50 nm or more and 400 nm or less, and further preferably 100 nm or more and 400 nm or less. In addition, the coefficient of variation (CV value) of the particle size of the polymer fine particle is preferably 5 or less.

The main methods for measuring the average particle size are dynamic light scattering (DLS), laser diffractometry (LD method), observation with an electron microscope, and the like, and in the present embodiment, dynamic light scattering can be preferably used. For example, a dispersion liquid of the polymer fine particle can be measured by dynamic light scattering, the obtained light intensity can be converted into a number distribution, and the average value can be used as the particle size. If the average particle size is 50 nm or more, there is no possibility that the cleaning treatment at the time of synthesis takes time. In addition, if the average particle size is 400 nm or less, there is no possibility that agglutination due to sedimentation during storage becomes remarkable.

For the coefficient of variation (CV value), an image of the polymer fine particle is taken using an electron microscope, the diameters of, for example, 100 or more particles are obtained, and the coefficient of variation (CV value) can be obtained by statistical processing. If the coefficient of variation (CV value) is 5 or less (the distribution width of the particle size is not too wide), there is no possibility that the reaction between a particle for a specimen test and an antigen becomes unstable.

The particle size of the polymer fine particle can be controlled by the proportion of the monomer and the aqueous medium at the time of synthesis, the amount of the water-soluble polymer added, the reaction temperature, and the reaction time.

A dispersion liquid of the polymer fine particle thus produced is purified by classification by filtration, decantation by centrifugation, ultrafiltration, or the like and removing an unreacted substance, an agglutinate, and the like.

The method for producing a test reagent according to the present invention includes dispersing a polymer fine particle in a dispersion medium.

Details of Particle According to the Present Embodiment

The particle according to an embodiment of the present invention is a particle having a copolymer including a repeating unit represented by the following formula (I) and a repeating unit represented by the following formula (II), and a structure represented by the following formula (III).

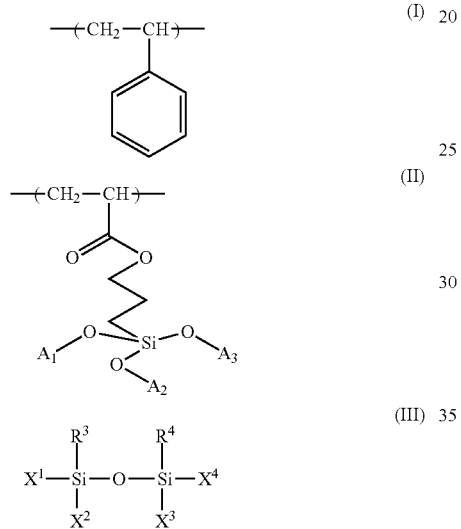

In formula (II), $A_1$ to $A_3$ are each independently any of —H, —$CH_3$, —$CH_2CH_3$, and a bond that bonds to Si in formula (II) via —O—.

In formula (III), $X^1$ to $X^4$ each independently represent a bond with Si which adjacent structures via O represented by formula (III) have, and a bond with 0 bonded to Si in formula (II), or a hydroxy group, at least one of the structural units represented by formula (III) has a bond with the copolymer, and at least any one of $R^3$ and $R^4$ represents a linear or branched alkyl group having 1 or more and 30 or less carbon atoms that optionally includes —NH—CO—, —NH—, —O—, —S—, or —CO— substituted with at least one carboxy group or at least one amino group.

In addition, at least one of the $R^3$ and $R^4$ preferably has a structure represented by the following formula (2) or a structure represented by the following formula (3), and at least one of $R^3$ and $R^4$ more preferably has a structure represented by the following formula (3).

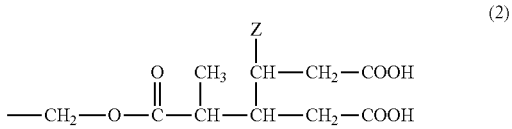

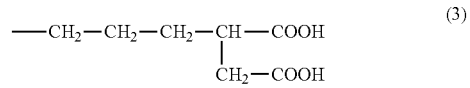

The copolymer including a repeating unit represented by the above formula (I) and a repeating unit represented by the above formula (II) may further include a repeating unit represented by the following formula (IV).

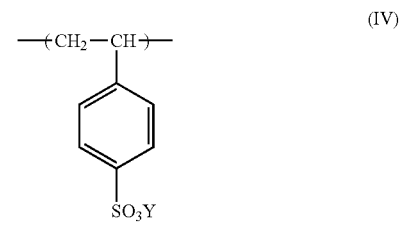

Y in formula (IV) is any of H, Na, and K.

<Particle for Specimen Test>

The polymer fine particle is a precursor particle for a specimen test. An antibody can be immobilized on the precursor particle and used as a particle for a specimen test.

As a method for immobilization, a functional group of the polymer fine particle is used, and immobilization is carried out by chemical bonding, physical adsorption, or the like. The method is not limited in the present invention.

In a particle for a specimen test in which an antibody is immobilized on the polymer fine particle, when an antigen is present in a specimen, the particles for a specimen test agglutinate with each other via the antigen, and the antigen can be detected by observing this agglutination. If the specimen does not include an antigen of interest, agglutination is unlikely to occur.

(Affinity Particle)

In the present embodiment, an affinity particle having the particle according to the present embodiment and a ligand bound to a reactive compound can be provided. In the present embodiment, the ligand refers to a compound that specifically binds to a receptor which a specific target substance has. The site where a ligand binds to a target substance is fixed and has a high affinity selectively or specifically. Examples thereof include an antigen and an antibody, an enzyme protein and a substrate therefor, a signaling substance such as a hormone and a neurotransmitter and a receptor therefor, and a nucleic acid, and the ligand in the present embodiment is not limited thereto. Examples of the nucleic acid include deoxyribonucleic acid. The affinity particle in the present embodiment has a high affinity selectively or specifically for a target substance. The ligand in the present embodiment is preferably any of an antibody, an antigen, and a nucleic acid.

In the present embodiment, as the method of a chemical reaction for chemically bonding the reactive functional group of the particle according to the present embodiment and the ligand, a conventionally known method can be applied to the extent that the object of the present invention can be achieved. In addition, when the ligand is amide-bonded, a catalyst such as 1-[3-(dimethylaminopropyl)-3-ethylcarbodiimide] can be appropriately used.

When the affinity particle in the present embodiment uses an antibody (antigen) as a ligand and an antigen (antigen) as a target substance, the affinity particle can be preferably applied to an immunolatex agglutination measurement method widely used in the fields of a clinical laboratory test, biochemical research, and the like.

(Test Reagent for In Vitro Diagnosis)

A test reagent for in vitro diagnosis in the present embodiment, that is, a test reagent used for detecting a target substance in a specimen by in vitro diagnosis, includes the affinity particle according to the present embodiment and a dispersion medium for dispersing the affinity particle. The amount of the affinity particle according to the present embodiment contained in the reagent in the present embodiment is preferably 0.001% by mass or more and 20% by mass or less, and more preferably 0.01% by mass or more and 10% by mass or less.

The reagent according to the present embodiment may include a third substance such as a solvent or a blocking agent in addition to the affinity particle according to the present embodiment to the extent that the object of the present invention can be achieved. The third substance such as a solvent or a blocking agent may be included in combinations of two or more.

Examples of the solvent used in the present embodiment include various buffer solutions such as a phosphate buffer solution, a glycine buffer solution, a Good buffer solution, a Tris buffer solution, and an ammonia buffer solution, and the solvent included in the reagent in the present embodiment is not limited to these.

When the reagent is used for detecting an antigen or an antibody in a specimen by a latex agglutination method, an antibody or an antigen can be used as the ligand.

(Test Kit for In Vitro Diagnosis)

The test kit for use in detecting a target substance in a specimen by in vitro diagnosis in the present embodiment includes the above test reagent and a housing accommodating the above test reagent.

The kit according to the present embodiment may contain a sensitizer for measuring latex agglutination. Examples of the sensitizer for measuring latex agglutination include polyvinyl alcohol, polyvinylpyrrolidone, and polyalginic acid, and the present invention is not limited thereto.

In addition, the kit according to the present embodiment may include a positive control, a negative control, a serum diluent, and the like. As a medium for a positive control and a negative control, a solvent may be used in addition to serum and physiological saline including no measurable target substance.

The kit according to the present embodiment can be used in the method for detecting a target substance according to the present embodiment as can the ordinary kit for detecting a target substance in a specimen by in vitro diagnosis. In addition, the concentration of a target substance can also be measured by a conventionally known method, and is preferably used for detecting the target substance in a specimen by an agglutination method, particularly a latex agglutination method.

(Detection Method)

The method for detecting a target substance in a specimen by in vitro diagnosis in the present embodiment includes mixing a specimen that can possibly include the target substance into the test reagent according to the present embodiment.

The mixing of the test reagent according to the present embodiment and a specimen is preferably carried out in the range of pH 3.0 to pH 11.0. In addition, the mixing temperature is in the range of 20° C. to 50° C., and the mixing time is in the range of 1 minute to 20 minutes. In addition, it is preferable to use a solvent in the present detection method. In addition, the concentration of the affinity particle according to the present embodiment in the detection method according to the present embodiment is preferably 0.001% by mass or more and 5% by mass or less, and more preferably 0.01% by mass or more and 1% by mass or less in the reaction system.

In the detection method according to the present embodiment, it is preferable to optically detect an agglutination reaction resulting from the mixing of the affinity particle according to the present embodiment and a specimen, that is, to detect a target substance in a specimen by a latex agglutination method. Specifically, the detection method according to the present embodiment preferably includes: mixing a specimen into the test reagent according to the present embodiment to obtain a mixture; irradiating the mixture with light; and detecting at least any of transmitted light and scattered light of the light with which the mixture has been irradiated.

By optically detecting the agglutination reaction that occurs in the mixture, the target substance in the specimen can be detected, and further, the concentration of the target substance can also be measured. As a method for optically detecting the aggregation reaction, an optical instrument that can detect scattered light intensity, transmitted light intensity, absorbance, or the like may be used to measure the amount of change in the value thereof.

EXAMPLES

Hereinafter, the present invention will be described more specifically with reference to Examples, Comparative Examples, and Reference Examples.

However, the present invention is not limited to the following Examples.

(Preparation of PSS-1)

90 g of a phosphate buffer solution (manufactured by Kishida Chemical Co., Ltd., pH 7.4) was placed in a 200-mL flask, and 0.9 g of polyvinylpyrrolidone K-30 (manufactured by Kishida Chemical Co., Ltd., molecular weight of 40000) was dissolved therein. Next, 3.0 g of 3-methacryloxypropyltrimethoxysilane (trade name: LS-3380, manufactured by Shin-Etsu Chemical Co., Ltd.) and 9.0 g of styrene (manufactured by Kishida Chemical Co., Ltd.) were added, and the resulting mixture was stirred for 10 minutes while nitrogen was blown thereinto at room temperature. Then, the emulsion in the flask was heated to 70° C. in an oil bath. A solution prepared by dissolving 0.3 g of potassium peroxodisulfate (manufactured by Wako Pure Chemical Industries, Ltd.) in 15 mL of a phosphate buffer solution (manufactured by Kishida Chemical Industries, Ltd., pH 7.4) was added to the emulsion heated to 70° C. After stirring at 70° C. for 7 hours, the temperature was returned to room temperature to obtain a dispersion liquid of a polystyrene-silica hybrid fine particle. The obtained polystyrene-silica hybrid fine particle was designated as PSS-1.

The average particle size of PSS-1 was evaluated by observation with an electron microscope and found to be 253 nm. In addition, the coefficient of variation of the particle size of PSS-1 was 1.5.

The obtained PSS-1 was dispersed in an epoxy resin and cured, then the resulting cured product was sliced into a thin piece using a microtome, and the thin piece was observed using a transmission electron microscope (TEM) and subjected to a scanning transmission electron microscope-energy dispersive X-ray analysis (STEM-EDS elemental analysis). As a result of carrying out elemental analysis of the outside and the central portion of the particle sliced into a thin piece on a cross-section of the particle, carbon, oxygen, and silicon were detected. There was no great difference in the amount of silicon detected based on the amount of carbon detected, and thus it was considered that there was no great bias in the distribution of silicon in the particle.

Further, the dispersion liquid of PSS-1 was subjected to a centrifuge to collect PSS-1, and the supernatant was discarded. The collected PSS-1 was redispersed in ion exchanged water and then subjected to a centrifuge again. The collection of PSS-1 using a centrifuge and the redispersion using ion exchanged water were repeated 4 times.

The dispersion liquid of PSS-1 thus obtained was adjusted such that the concentration of the particle was 0.5% by mass and the volume of the dispersion liquid of the particle was 200 mL.

(Preparation of PSS-2)

157 g of a 50 mM 2-morpholinoethanesulfonic acid (MES, manufactured by Tokyo Chemical Industry Co., Ltd.) buffer solution (pH 7.0) and 1.3 g of polyvinylpyrrolidone K-30 (molecular weight of 40000 manufactured by Kishida Chemical Co., Ltd.) were mixed. Next, 4 g of 3-methacryloxypropyltrimethoxysilane (manufactured by Shin-Etsu Chemical Co., Ltd., LS-3380) and 13 g of styrene (manufactured by Kishida Chemical Co., Ltd.) were added, and the resulting mixture was stirred for 10 minutes while nitrogen was blown thereinto at room temperature. Then, the emulsion in the flask was heated to 70° C. in an oil bath. 0.5 g of potassium peroxodisulfate (manufactured by Wako Pure Chemical Industries, Ltd.) was dissolved in ion exchanged water, and the resulting solution was added to the emulsion heated to 70° C. After stirring at 70° C. for 7 hours, heating was stopped followed by stirring overnight to obtain a dispersion liquid of a polystyrene-silica hybrid fine particle. The obtained polystyrene-silica hybrid fine particle was designated as PSS-2.

Further, the dispersion liquid of PSS-2 was subjected to a centrifuge to collect PSS-2, and the supernatant was discarded. The collected PSS-2 was washed by repeating the operation of being redispersed in ion exchanged water and then being subjected to a centrifuge a plurality of times.

The average particle size of PSS-2 thus obtained was evaluated by dynamic light scattering using a particle size analyzer (trade name: Zetasizer, manufactured by Malvern Panalytical Ltd) and found to be 203 nm.

(Preparation of PSS-3)

The following materials were mixed.
50 mM phosphate buffer solution (Kishida Chemical Co., Ltd., pH 7.4): 157 g
Polyvinylpyrrolidone K-30 (manufactured by Kishida Chemical Co., Ltd., molecular weight of 40000): 0.43 g
Random copolymer of N-vinyl-2-pyrrolidone and acrylic acid (manufactured by Polymer Source, Inc., molecular weight of 60000, ratio of number of molecules of N-vinyl-2-pyrrolidone:number of molecules of acrylic acid=4:6, hereinafter, abbreviated as PVP-PAA): 0.87 g Next, 4 g of 3-methacryloxypropyltrimethoxysilane (trade name: LS-3380, manufactured by Shin-Etsu Chemical Co., Ltd.) and 13 g of styrene (manufactured by Kishida Chemical Co., Ltd.) were added, and the resulting mixture was stirred for 10 minutes while nitrogen was blown thereinto at room temperature. Then, the emulsion in the flask was heated to 70° C. in an oil bath. 0.5 g of potassium peroxodisulfate (manufactured by Wako Pure Chemical Industries, Ltd.) was dissolved in ion exchanged water, and the resulting solution was added to the emulsion heated to 70° C. After stirring at 70° C. for 7 hours, heating was stopped followed by stirring overnight to obtain a dispersion liquid of a polystyrene-silica hybrid fine particle. The obtained polystyrene-silica hybrid fine particle was designated as PSS-3.

Further, the dispersion liquid of PSS-3 was subjected to a centrifuge to collect PSS-3, and the supernatant was discarded. The collected PSS-3 was washed by repeating the operation of being redispersed in ion exchanged water and then being subjected to a centrifuge a plurality of times.

The average particle size of PSS-3 thus obtained was evaluated by dynamic light scattering using a particle size analyzer (trade name: Zetasizer, manufactured by Malvern Panalytical Ltd) and found to be 301 nm.

(Preparation of PSS-4)

The following materials were mixed.
25 mM 2-morpholinoethanesulfonic acid (MES, manufactured by Tokyo Chemical Industry Co., Ltd.) buffer solution (pH 7.0): 157 g
Polyvinylpyrrolidone K-30 (manufactured by Kishida Chemical Co., Ltd., molecular weight of 40000): 1.3 g
Sodium parastyrenesulfonate (NaPSS): 0.05 g Next, 4 g of 3-methacryloxypropyltrimethoxysilane (trade name: LS-3380, manufactured by Shin-Etsu Chemical Co., Ltd.) and 13 g of styrene (manufactured by Kishida Chemical Co., Ltd.) were added, and the resulting mixture was stirred for 10 minutes while nitrogen was blown thereinto at room temperature. Then, the emulsion in the flask was heated to 70° C. in an oil bath. 0.5 g of potassium peroxodisulfate (manufactured by Wako Pure Chemical Industries, Ltd.) was dissolved in ion exchanged water, and the resulting solution was added to the emulsion heated to 70° C. After stirring at 70° C. for 7 hours, heating was stopped followed by stirring overnight to obtain a dispersion liquid of a polystyrene-silica hybrid fine particle. The obtained polystyrene-silica hybrid fine particle was designated as PSS-4.

Further, the dispersion liquid of PSS-4 was subjected to a centrifuge to collect PSS-4, and the supernatant was discarded. The collected PSS-4 was washed by repeating the operation of being redispersed in ion exchanged water and then being subjected to a centrifuge a plurality of times.

The average particle size of PSS-4 thus obtained was evaluated by dynamic light scattering using a particle size analyzer (trade name: Zetasizer, manufactured by Malvern Panalytical Ltd) and found to be 153 nm.

(Preparation of PSS-5)

The amount of NaPSS used in the preparation of PSS-4 was changed to 0.3 g. PSS-5 was prepared in the same manner as in the preparation of PSS-4 except for the above.

The average particle size of PSS-5 thus obtained was evaluated by dynamic light scattering using a particle size analyzer (trade name: Zetasizer, manufactured by Malvern Panalytical Ltd) and found to be 93 nm.

Example 1

2 g of Tween 20 (manufactured by Tokyo Chemical Industry Co., Ltd.) as a surfactant was added to the PSS-1 dispersion liquid, 0.1 mL of X-12-1135 (manufactured by Shin-Etsu Chemical Co., Ltd.), which is a silane coupling agent having a carboxy group, was further added, and the resulting mixture was stirred at room temperature for 14 hours. The particle thus obtained was designated as PSSX-1.

The average particle size of PSSX-1 was evaluated by observation with an electron microscope and found to be 250 nm. In addition, the coefficient of variation of the particle size of PSSX-1 was 1.4.

Further, the dispersion liquid of PSSX-1 was subjected to a centrifuge to collect PSSX-1, and the supernatant was discarded. PSSX-1 was dispersed in ion exchanged water and adjusted such that the particle solid concentration was 1.0% by mass.

Example 2

The amount of X-12-1135 (manufactured by Shin-Etsu Chemical Co., Ltd.) used in Example 1 was changed to 0.01 mL. The same procedure as in Example 1 except for the above was carried out, and the obtained particle was designated as PSSX-2. PSSX-2 was dispersed in ion exchanged water to obtain a dispersion liquid having a particle solid concentration of 1.0% by mass.

The average particle size of PSSX-2 was evaluated by observation with an electron microscope and found to be 254 nm. In addition, the coefficient of variation of the particle size of PSSX-2 was 1.5.

Example 3

X-12-1135 (manufactured by Shin-Etsu Chemical Co., Ltd.) in Example 1 was changed to KBP-90 (manufactured by Shin-Etsu Chemical Co., Ltd.), which is a silane coupling agent having an amino group, and the amount used was 0.01 mL. The same procedure as in Example 1 except for the above was carried out. The obtained polymer fine particle was dispersed in ion exchanged water to obtain a dispersion liquid having a particle solid concentration of 1.0% by mass.

Next, succinic anhydride dissolved in dimethylsulfoxide was placed in the obtained polymer fine particle dispersion liquid at a proportion of 0.1% by mass based on the dispersion liquid, and the resulting mixture was stirred at room temperature for 14 hours to modify the surface of the polymer fine particle. The obtained particle was designated as PSSX-3.

The average particle size of PSSX-3 was evaluated by observation with an electron microscope and found to be 255 nm. In addition, the coefficient of variation of the particle size of PSSX-3 was 1.4.

Example 4

X-12-1135 (manufactured by Shin-Etsu Chemical Co., Ltd.) in Example 1 was changed to KBP-64 (manufactured by Shin-Etsu Chemical Co., Ltd.), which is a silane coupling agent having ethylenediamine, and the amount used was 0.01 mL. The same procedure as in Example 1 except for the above was carried out, and the obtained polymer fine particle was dispersed in ion-exchanged water to obtain a dispersion liquid having a particle solid concentration of 1.0% by mass.

Next, the same treatment as in the modification of the polymer fine particle with a carboxy group in Example 3 was carried out to modify the surface of PSSX-4 with a carboxy group. The obtained particle was designated as PSSX-4.

The average particle size of PSSX-4 was evaluated by observation with an electron microscope and found to be 255 nm. In addition, the coefficient of variation of the particle size of PSSX-4 was 1.4.

Examples 5 to 16

Each of PSS-2 to PSS-5 was used as an original particle and mixed with a 0.5 M 2-morpholinoethanesulfonic acid (MES, manufactured by Tokyo Chemical Industry Co., Ltd.) buffer solution (pH 7.0), Tween® 20 as a surfactant (manufactured by Tokyo Chemical Industry Co., Ltd.) and ion exchanged water. This mixture was stirred at room temperature for 15 minutes, then X-12-1135 (manufactured by Shin-Etsu Chemical Co., Ltd.), which is a silane coupling agent having a carboxy group, was added, and the resulting mixture was stirred overnight at room temperature. Each material was used in the amount shown in Table 1 or the amount which reached the final concentration shown in Table 1.

Subsequently, the resulting dispersion liquid was subjected to a centrifuge, and the supernatant was discarded. The collected particle was washed by repeating the operation of being redispersed in ion exchanged water and then being subjected to a centrifuge a plurality of times. The obtained particles according to Examples 5 to 16 were designated as PSSX-5 to PSSX-16, respectively.

TABLE

| Example | Particle | Original particle | Amount of original particle used | Amount of MES buffer solution used | Final concentration of surfactant | Amount of ion exchanged water used | Amount of silane coupling agent used |
|---|---|---|---|---|---|---|---|
| Example 5 | PSSX-5 | PSS-2 | 0.4 g | 0 mL | 1 wt % | 40 mL | 0.04 mL |
| Example 6 | PSSX-6 | PSS-2 | 0.4 g | 0 mL | 1 wt % | 120 mL | 0.4 mL |
| Example 7 | PSSX-7 | PSS-2 | 0.4 g | 0 mL | 1 wt % | 40 mL | 0.4 mL |
| Example 8 | PSSX-8 | PSS-3 | 0.3 g | 0 mL | 0 wt % | 30 mL | 0.03 mL |
| Example 9 | PSSX-9 | PSS-3 | 0.3 g | 0 mL | 0 wt % | 30 mL | 0.06 mL |
| Example 10 | PSSX-10 | PSS-3 | 0.3 g | 0 mL | 0 wt % | 30 mL | 0.09 mL |
| Example 11 | PSSX-11 | PSS-4 | 1 g | 0 mL | 1 wt % | 300 mL | 0.67 mL |
| Example 12 | PSSX-12 | PSS-4 | 1 g | 0 mL | 1 wt % | 300 mL | 1.33 mL |
| Example 13 | PSSX-13 | PSS-4 | 1 g | 0 mL | 1 wt % | 300 mL | 2 mL |
| Example 14 | PSSX-14 | PSS-5 | 1 g | 0 mL | 1 wt % | 300 mL | 2 mL |
| Example 15 | PSSX-15 | PSS-5 | 1 g | 0.6 mL | 1 wt % | 300 mL | 2 mL |
| Example 16 | PSSX-16 | PSS-5 | 1 g | 3 mL | 1 wt % | 300 mL | 2 mL |

The average particle size was evaluated by dynamic light scattering using a particle size analyzer (trade name: Zetasizer, manufactured by Malvern Panalytical Ltd). As a result, the average particle size of PSSX-11 was 165 nm, the average particle size of PSSX-12 was 171 nm, and the average particle size of PSSX-13 was 176 nm.

Comparative Example 1

An IMMUTEX polymer particle for immunodiagnosis P0113 (manufactured by JSR Corporation, a polymer particle having a carboxy group bonded to a polystyrene particle having a particle size of 0.187 μm, hereinafter simply referred to as P0113) was used as the particle according to Comparative Example 1. The concentration of P0113 was adjusted to 1.0% by mass using ion exchanged water.

The average particle size of P0113 was evaluated by observation with an electron microscope and found to be 190 nm. The coefficient of variation of the particle size of P0113 was 2.1.

Comparative Example 2

An IMMUTEX polymer particle for immunodiagnosis P0307 (manufactured by JSR Corporation, a polymer particle having a carboxy group bonded to a polystyrene particle having a particle size of 0.351 μm, hereinafter simply referred to as P0307) was used as the particle according to Comparative Example 2. The concentration of P0307 was adjusted to 1.0% by mass using ion exchanged water.

The average particle size of P0307 was evaluated by observation with an electron microscope and found to be 355 nm. The coefficient of variation of the particle size of P0307 was 2.8.

Reference Example 1

90 g of a phosphate buffer solution (manufactured by Kishida Chemical Co., Ltd., pH 6.4) was added to a 200-mL flask, and 0.9 g of polyvinylpyrrolidone K-30 (manufactured by Kishida Chemical Co., Ltd., molecular weight of 40000) was dissolved therein. Next, 0.4 g of 3-methacryloxypropyltrimethoxysilane (manufactured by Shin-Etsu Chemical Co., Ltd., LS-3380) and 11.6 g of styrene (manufactured by Kishida Chemical Co., Ltd.) were added, and the resulting mixture was stirred for 10 minutes while nitrogen was blown thereinto at room temperature. Then, the emulsion in the flask was heated to 70° C. in an oil bath. A solution prepared by dissolving 0.3 g of potassium peroxodisulfate (manufactured by Wako Pure Chemical Industries, Ltd.) in 15 mL of water was added to the emulsion heated to 70° C. After stirring at 70° C. for 6 hours, the temperature was returned to room temperature to obtain a dispersion liquid of a polystyrene-silica hybrid fine particle. The obtained polystyrene-silica hybrid fine particle was designated as PSS-7.

Further, the dispersion liquid of PSS-7 was subjected to a centrifuge to collect PSS-7, and the supernatant was discarded. The collected PSS-7 was redispersed in ion exchanged water and then subjected to a centrifuge again. The collection of PSS-7 using a centrifuge and the redispersion using ion exchanged water were repeated 4 times.

The dispersion liquid of PSS-7 thus obtained was adjusted such that the concentration was 1.0% by mass.

The average particle size of PSS-7 was evaluated by observation with an electron microscope and found to be 140 nm. In addition, the coefficient of variation of the particle size of PSS-7 was 2.0.

Reference Example 2

90 g of a phosphate buffer solution (manufactured by Kishida Chemical Co., Ltd., pH 9.0) was added to a 200-mL flask, and 0.4 g of polyvinylpyrrolidone K-30 (manufactured by Kishida Chemical Co., Ltd., molecular weight of 40000) was dissolved therein. Next, 7.2 g of 3-methacryloxypropyltrimethoxysilane (manufactured by Shin-Etsu Chemical Co., Ltd., LS-3380) and 4.8 g of styrene (manufactured by Kishida Chemical Co., Ltd.) were added, and the resulting mixture was stirred for 10 minutes while nitrogen was blown thereinto at room temperature. Then, the emulsion in the flask was heated to 80° C. in an oil bath. A solution prepared by dissolving 0.3 g of potassium peroxodisulfate (manufactured by Wako Pure Chemical Industries, Ltd.) in 15 mL of water was added to the emulsion heated to 80° C. After stirring at 80° C. for 4 hours, the temperature was returned to room temperature to obtain a dispersion liquid of a polystyrene-silica hybrid fine particle. The obtained polystyrene-silica hybrid fine particle was designated as PSS-8.

Further, the dispersion liquid of PSS-8 was subjected to a centrifuge to collect PSS-8, and the supernatant was discarded. The collected PSS-8 was redispersed in ion exchanged water and then subjected to a centrifuge again. The collection of PSS-8 using a centrifuge and the redispersion using ion exchanged water were repeated 4 times.

The dispersion liquid of PSS-8 thus obtained was adjusted such that the concentration was 1.0% by mass.

The average particle size of PSS-8 was evaluated by observation with an electron microscope and found to be 295 nm. In addition, the coefficient of variation of the particle size of PSS-8 was 3.0.

Reference Example 3

The PSS-1 dispersion liquid was diluted to 0.1% by mass, aminopropyltrimethoxysilane was added at a proportion of 0.05% by mass based on the dispersion liquid, and the resulting mixture was stirred at room temperature for 14 hours to modify the surface of PSS-1 with an amino group. The particle thus obtained was designated as PSSZ-1.

The average particle size of PSSZ-1 was evaluated by observation with an electron microscope and found to be 255 nm. In addition, the coefficient of variation of the particle size of PSSZ-1 was 1.5.

Reference Example 4

The PSS-1 dispersion liquid was diluted to 0.1% by mass, 28% by mass of aqueous ammonia was added in an amount of 2% by mass, and mercaptopropyltrimethoxysilane was added at a proportion of 0.05% by mass based on the dispersion liquid. Then, the resulting mixture was stirred at room temperature for 14 hours to modify the surface of PSS-1 with a thiol group. The particle thus obtained was designated as PSSZ-2.

The average particle size of PSSZ-2 was evaluated by observation with an electron microscope and found to be 262 nm. In addition, the coefficient of variation of the particle size of PSSZ-2 was 1.7.

Reference Example 5

The PSS-1 dispersion liquid was diluted to 0.1% by mass, aminopropyltrimethoxysilane was added at a proportion of 0.05% by mass based on the dispersion liquid, and the resulting mixture was stirred at room temperature for 14 hours to modify the surface of PSS-1 with an amino group. Further, the same treatment as in the modification of the polymer fine particle with a carboxy group in Example 3 was carried out to modify the surface of the particle with a carboxy group. The particle thus obtained was designated as PSSZ-3.

The average particle size of PSSZ-3 was evaluated by observation with an electron microscope and found to be 255 nm. In addition, the coefficient of variation of the particle size of PSSZ-3 was 1.5.

Reference Example 6

The PSS-1 dispersion liquid was diluted to 0.1% by mass and Si-tagged fusion protein A (manufactured by Siliconbio Inc., a fusion protein of an antibody-binding protein (protein A) and a peptide that binds to a silanol group) was added. Then, Si-tagged fusion protein A was immobilized on the surface of PSS-1. The particle thus obtained was designated as PSSZ-4.

The average particle size of PSSZ-4 was evaluated by observation with an electron microscope and found to be 253 nm. In addition, the coefficient of variation of the particle size of PSSZ-4 was 1.5.

Reference Example 7

3-Glycidyloxypropyltrimethoxysilane, glycine, and 28% by mass aqueous ammonia were added to the PSS-1 dispersion liquid at a proportion of 0.5% by mass, 0.5% by mass, and 2% by mass, respectively, based on the dispersion liquid, and the resulting mixture was stirred at room temperature for 14 hours. Then, the surface of the polymer fine particle was modified with a glycidyl group. The particle thus obtained was designated as PSSZ-5.

The average particle size of PSSZ-5 was evaluated by observation with an electron microscope and found to be 260 nm. In addition, the coefficient of variation of the particle size of PSSZ-5 was 2.1.

Reference Example 8

A dimethylsulfoxide solution of trimethoxypropylsuccinic anhydride was added to the PSS-1 dispersion liquid at a proportion of 0.4% by mass based on the dispersion liquid, and the resulting mixture was stirred at room temperature for 14 hours to modify the surface of PSS-1 with a dicarboxy group. The particle thus obtained was designated as PSSZ-6.

The average particle size of PSSZ-6 was evaluated by observation with an electron microscope and found to be 265 nm. In addition, the coefficient of variation of the particle size of PSSZ-6 was 1.8.

Reference Example 9

X-12-1135 (manufactured by Shin-Etsu Chemical Co., Ltd.) in Example 1 was changed to X-12-967C (manufactured by Shin-Etsu Chemical Co., Ltd.), which is a silane coupling agent having succinic anhydride, and the amount used was 0.01 mL. The same procedure as in Example 1 except for the above was carried out, and the obtained particle was designated as PSSX-17. PSSX-17 was dispersed in ion exchanged water to obtain a dispersion liquid having a particle solid concentration of 1.0% by mass.

The average particle size of PSSX-17 was evaluated by observation with an electron microscope and found to be 252 nm. In addition, the coefficient of variation of the particle size of PSSX-17 was 1.5.

Reference Example 10

The concentration of the MES buffer solution and the amount of each material used in the preparation of PSS-2 were changed as shown in Table 1. Polystyrene-silica hybrid fine particles were obtained in the same manner as in the preparation of PSS-2 except for the above. The obtained polystyrene-silica hybrid fine particles were designated as PSS-9 to 17, respectively.

In addition, results of evaluation of the average particle sizes of PSS-9 to 17 obtained by dynamic light scattering using a particle size analyzer (trade name: Zetasizer, manufactured by Malvern Panalytical Ltd) are shown in Table 2.

TABLE 2

| Particle | MES buffer solution Concentration | Amount used | Amount of PVP K-30 used | Amount of styrene used | Amount of 3-methacryloxy-propyltrimethoxy-silane used | Amount of potassium peroxodi-sulfate used | Particle size |
|---|---|---|---|---|---|---|---|
| PSS-2  | 50 mM | 157 g | 1.3 g | 13 g | 4 g   | 0.5 g  | 203 nm |
| PSS-9  | 40 mM | 157 g | 1.3 g | 13 g | 4 g   | 0.5 g  | 205 nm |
| PSS-10 | 25 mM | 157 g | 1.3 g | 13 g | 4 g   | 0.3 g  | 217 nm |
| PSS-11 | 25 mM | 157 g | 1.3 g | 17 g | 5.3 g | 0.3 g  | 242 nm |
| PSS-12 | 15 mM | 157 g | 1.3 g | 13 g | 4 g   | 0.2 g  | 249 nm |
| PSS-13 | 15 mM | 157 g | 1.3 g | 11 g | 6 g   | 0.2 g  | 235 nm |
| PSS-14 | 15 mM | 157 g | 1.3 g | 9 g  | 8 g   | 0.2 g  | 255 nm |
| PSS-15 | 15 mM | 157 g | 1.3 g | 15 g | 2 g   | 0.2 g  | 237 nm |
| PSS-16 | 8 mM  | 157 g | 1.3 g | 13 g | 4 g   | 0.1 g  | 291 nm |
| PSS-17 | 4 mM  | 157 g | 1.3 g | 13 g | 4 g   | 0.05 g | 385 nm |

Reference Example 11

The amount of each material used in the preparation of PSS-3 was changed as follows.
- 50 mM phosphate buffer solution (Kishida Chemical Co., Ltd., pH 7.4): 39 g
- Polyvinylpyrrolidone K-30 (manufactured by Kishida Chemical Co., Ltd., molecular weight of 40000): 0 g (not used)
- Random copolymer of N-vinyl-2-pyrrolidone and acrylic acid (manufactured by Polymer Source, Inc., molecular weight of 60000, ratio of number of molecules of N-vinyl-2-pyrrolidone:number of molecules of acrylic acid=4:6, hereinafter abbreviated as PVP-PAA): 0.33 g
- 3-Methacryloxypropyltrimethoxysilane (trade name: LS-3380, manufactured by Shin-Etsu Chemical Co., Ltd.): 1 g
- Styrene (manufactured by Kishida Chemical Co., Ltd.): 3 g
- Potassium peroxodisulfate (manufactured by Wako Pure Chemical Industries, Ltd.): 0.125 g A polystyrene-silica hybrid fine particle was obtained in the same manner as in the preparation of PSS-3 except for the above. The obtained polystyrene-silica hybrid fine particle was designated as PSS-18.

The average particle size of PSS-18 thus obtained was evaluated by dynamic light scattering using a particle size analyzer (trade name: Zetasizer, manufactured by Malvern Panalytical Ltd) and found to be 203 nm.

Reference Example 12

The concentration of the MES buffer solution used in the preparation of PSS-4 was changed to 50 mM. PSS-19 was prepared in the same manner as in the preparation of PSS-4 except for the above.

The average particle size of PSS-19 thus obtained was evaluated by dynamic light scattering using a particle size analyzer (trade name: Zetasizer, manufactured by Malvern Panalytical Ltd) and found to be 138 nm.

Reference Example 13

The amount of NaPSS used in the preparation of PSS-4 was changed to 0.1 g. PSS-20 was prepared in the same manner as in the preparation of PSS-4 except for the above.

The average particle size of PSS-20 thus obtained was evaluated by dynamic light scattering using a particle size analyzer (trade name: Zetasizer, manufactured by Malvern Panalytical Ltd) and found to be 126 nm.

PSSX-11 (average particle size of 165 nm), PSSX-12 (average particle size of 171 nm), and PSSX-13 (average particle size of 176 nm) all had larger particle sizes than the PSS-4 particle (particle size of 153 nm). In addition, the following tendency was shown: as the amount of the silane coupling agent added increases, the particle size increases. That is, the thickness of a layer covering a particle can be regulated by regulating the amount of the silane coupling agent.

By carrying out acid-base titration while measuring the electrical conductivity of a particle solution, the amount of a carboxy group in the particle can be calculated from the resulting titration curve. According to this method, the PSSX-5 particle, the PSSX-6 particle, the PSSX-7 particle, the PSSX-11 particle, the PSSX-12 particle, and the PSSX-13 particle were evaluated. Results are shown in Table 3.

TABLE 3

| Particle | Carboxy group content (nmol/mg) |
|---|---|
| PSSX-5 | 24 |
| PSSX-6 | 68 |
| PSSX-7 | 110 |
| PSSX-11 | 29 |
| PSSX-12 | 61 |
| PSSX-13 | 132 |

From the results shown in Table 3, it can be seen that the amount of a carboxy group in a particle can be regulated by regulating the amount of the silane coupling agent.

Antibody Binding Example 1

An anti-C-reactive protein (hereinafter, abbreviated as CRP) antibody was bound to PSSX-1, PSSX-2, PSSZ-3, PSSZ-5, PSSZ-6, PSSX-17, and PSS-2 as follows.

First, each particle dispersion liquid was centrifuged at 15000 rpm (20400 g) for 15 minutes to precipitate the particle. The supernatant was removed, then a pellet of the particle was redispersed in an MES buffer solution, and water-soluble carbodiimide (WSC) was added thereto. Further, N-hydroxysuccinimide was added. The particle dispersion liquid was stirred at room temperature for 30 minutes, and then the particle was collected by centrifugation. The collected particle was washed with an MES buffer solution, then redistributed in an MES buffer solution, and an anti-CRP antibody was added such that the final concentration was 100 µg/mL. After stirring at room temperature for 180 minutes, the particle was collected by centrifugation. The collected particle was thoroughly washed with a tris(hydroxymethyl)aminomethane (Tris) buffer solution to obtain a particle to which the anti-CRP antibody was bound. The obtained particles to which the CRP antibody was bound were designated as PSSX-1-Ab, PSSX-2-Ab, PSSZ-3-Ab, PSSZ-5-Ab, PSSZ-6-Ab, PSSX-17-Ab, and PSS-2-Ab, respectively.

The binding of the antibody to each of the obtained particles was confirmed by confirming, by measurement by a BCA assay, that the concentration of the antibody in the buffer solution to which the antibody was added decreased. It was found that about 100 to 500 antibodies were bound per particle. All of the obtained particles were stably dispersed in the buffer solution, and did not need to be post-coated with BSA.

Antibody Binding Example 2

The dispersion liquids (solution having a concentration of 1.0% by mass, 10 mg/mL) of PSSX-6, PSSX-7, PSSX-11, PSSX-12, and PSSX-13 were transferred in an amount of 0.1 mL (particle: 1 mg) each to their respective microtubes (volume of 1.5 mL). To these, 0.12 mL of an activation buffer solution (25 mM MES buffer solution, pH 6.0) was added, and each of the resulting mixtures was centrifuged at 4° C. and 15000 rpm (20400 g) for 20 minutes. After the centrifugation, the supernatant was discarded using a pipetter. Subsequently, 0.12 mL of the activation buffer solution was added, and dispersion was carried out by an ultrasonic wave using an ultrasonic cleaner (trade name: MODEL VS-100III AS ONE Three-frequency ultrasonic cleaner, manufactured by AS ONE Corporation, 28 kHz). Next, the resulting dispersion liquid was centrifuged at 15000 rpm (20400 g) at 4° C. for 20 minutes. The supernatant was discarded using a pipetter, 0.12 mL of the activation buffer solution was added, and dispersion was carried out by an ultrasonic wave. Subsequently, the resulting dispersion liquid was centrifuged at 4° C. and 15000 rpm (20400 g) for 20 minutes, and the supernatant was discarded using a pipetter. Subsequently, a WSC solution (50 mg of WSC dissolved in 1 mL of the activation buffer solution) and an N-hydroxysulfosuccinimide (Sulfo NHS) solution (50 mg of Sulfo NHS dissolved in 1 mL of the activation buffer solution) were added in an amount of 60 µL each. After the addition, dispersion was carried out by an ultrasonic wave. In addition, the resulting dispersion liquid was stirred at room temperature for 30 minutes to convert the carboxy group of the particle into an active ester.

Subsequently, the dispersion liquid was centrifuged at 4° C. and 15000 rpm (20400 g) for 20 minutes, and the supernatant was discarded using a pipetter. 0.2 mL of an immobilization buffer solution (25 mM MES buffer solution, pH 5.0) was added, and dispersion was carried out by an ultrasonic wave. The resulting dispersion liquid was centrifuged at 4° C. and 15000 rpm (20400 g) for 20 minutes, and the supernatant was discarded using a pipetter. The immobilization buffer solution was added in an amount of 50 µL per mg of the particle, and the particle in which the carboxy group was activated was dispersed by an ultrasonic wave.

The anti-human CRP antibody (polyclonal antibody) was diluted using the immobilization buffer solution such that the concentration was 25 µg/50 µL, 50 µg/50 µL, 100 µg/50 µL, or 200 µg/50 µL (referred to as an antibody solution). 50 µL of the antibody solution of each concentration was added to 50 µL of a solution of the particle in which the carboxy group was activated (including 1 mg of the particle), and the particle was dispersed by an ultrasonic wave. As shown in Table 4, the amounts of the antibody used for binding is 25, 50, 100, and 200 µg per mg of the particle, respectively. The tube was stirred at room temperature for 60 minutes to immobilize the antibody to the carboxy group of the particle. Subsequently, the dispersion liquid was centrifuged at 4° C. and 15000 rpm (20400 g) for 20 minutes, and the supernatant was discarded using a pipetter.

0.24 mL of an active ester inactivation buffer solution (1 M Tris buffer solution, pH 8.0 including 0.1% Tween® 20) including tris(hydroxymethyl)aminomethane (Tris) was added, and dispersion was carried out by an ultrasonic wave. The resulting dispersion liquid was stirred at room temperature for 1 hour to bind Tris to the remaining activated ester, and then was allowed to stand at 4° C. overnight.

Subsequently, the dispersion liquid was centrifuged at 4° C. and 15000 rpm (20400 g) for 20 minutes, and the supernatant was discarded using a pipetter. 0.2 mL of a wash/storage buffer solution (10 mM 2-[4-(2-hydroxyethyl)-1-piperazinyl]-ethanesulfonic acid (HEPES) buffer solution, pH 7.9) was added, and dispersion was carried out by an ultrasonic wave. A washing operation using 0.2 mL of the wash/storage buffer solution was repeated twice, and then 1.0 mL of the wash/storage buffer solution was added, and dispersion was carried out by an ultrasonic wave. Almost no particle loss was observed in the above steps, and thus the antibody-sensitized particle concentration was finally 0.1% by mass (1 mg/mL). The particle was stored in a refrigerator and redispersed by an ultrasonic wave when used.

The average particle size of the obtained antibody-sensitized particles was evaluated by dynamic light scattering using a particle size analyzer (trade name: Zetasizer, manufactured by Malvern Panalytical Ltd). The types and average particle sizes of the obtained antibody-sensitized particles are shown in Table 4.

(Measurement of Antibody Sensitization Efficiency)

It was confirmed by protein quantification that the antibody sensitized (was immobilized to) the antibody-sensitized particles prepared in Antibody Binding Example 2.

Specifically, the antibody-sensitized particles were reacted with a BCA reagent. First, 25 µL (amount of particle of 25 µg) of a dispersion liquid (0.1% by mass solution) of each antibody-sensitized particle was aliquoted. 7 mL of liquid A of a Protein Assay BCA Kit (manufactured by Wako Pure Chemical Industries, Ltd.) and 140 µL of liquid B thereof were mixed to obtain liquid AB. 200 µL of liquid AB was added to 25 µL of the dispersion liquid, and the resulting mixture was allowed to stand at 60° C. for 30 minutes. Subsequently, the solution after standing was centrifuged at 4° C. and 15000 rpm (20400 g) for 5 minutes, and the supernatant was collected using a pipetter. The collected solution was measured for absorbance for light having a wavelength of 562 nm using a multimode microplate reader (trade name: SynergyMX, manufactured by BioTek Instruments, Inc.). Separately, a plurality of standard samples prepared by dissolving the antibody in 10 mM HEPES such that the concentration was in the range of 0 to 200 µg/mL were provided. The solutions obtained by reacting the provided standard samples with the BCA reagent were also similarly measured for absorbance for light having a wavelength of 562 nm to prepare a standard curve. Using the obtained standard curve, the amount of the antibody bound to each of the antibody-sensitized particles was determined.

The amount of antibody sensitization of the antibody-sensitized particle (amount of antibody immobilized per unit mass of antibody-sensitized particle (µg/mg)) was determined by dividing the amount of the antibody determined above by the mass of antibody-sensitized particle used for measurement. Further, the antibody sensitization efficiency was determined from the amount of the antibody used for binding and the amount of antibody sensitization.

Results are shown in Table 4.

From the measurement results of the antibody sensitization efficiency, it was found that as the amount of the silane coupling agent used increases, the antibody sensitization efficiency increases. One reason for this is that as the amount of the silane coupling agent used increases, the amount of a carboxy group on the particle surface increases and the number of points for immobilizing the antibody increases.

TABLE 4

| Antibody-sensitized particle | Raw material particle | Proportion of antibody used to raw material particle | Antibody sensitization efficiency | Particle size of antibody-sensitized particle |
|---|---|---|---|---|
| PSSX-6-Ab50 | PSSX-6 | 50 µg/mg | 96% | 200 nm |
| PSSX-6-Ab100 | PSSX-6 | 100 µg/mg | 88% | 203 nm |
| PSSX-6-Ab200 | PSSX-6 | 200 µg/mg | 57% | 206 nm |
| PSSX-7-Ab50 | PSSX-7 | 50 µg/mg | 100% | 202 nm |
| PSSX-7-Ab100 | PSSX-7 | 100 µg/mg | 100% | 200 nm |
| PSSX-7-Ab200 | PSSX-7 | 200 µg/mg | 74% | 206 nm |
| PSSX-11-Ab25 | PSSX-11 | 25 µg/mg | 25% | 161 nm |
| PSSX-11-Ab50 | PSSX-11 | 50 µg/mg | 21% | 160 nm |
| PSSX-11-Ab100 | PSSX-11 | 100 µg/mg | 14% | 163 nm |
| PSSX-12-Ab25 | PSSX-12 | 25 µg/mg | 56% | 161 nm |
| PSSX-12-Ab50 | PSSX-12 | 50 µg/mg | 61% | 161 nm |
| PSSX-12-Ab100 | PSSX-12 | 100 µg/mg | 49% | 164 nm |
| PSSX-13-Ab25 | PSSX-13 | 25 µg/mg | 91% | 164 nm |
| PSSX-13-Ab50 | PSSX-13 | 50 µg/mg | 99% | 164 nm |
| PSSX-13-Ab100 | PSSX-13 | 100 µg/mg | 85% | 165 nm |

Antibody Binding Example 3

An antibody was bound to PSSX-8, PSSX-9, and PSSX-10 prepared in Examples 8 to 10, PSS-3, and PSS-18 prepared in Reference Example 11.

The anti-human CRP antibody (polyclonal antibody) in Antibody Binding Example 2 was changed to two anti-human prostate-specific antigen (hereinafter, referred to as PSA) antibodies (monoclonal antibodies). The same procedure as in Antibody Binding Example 2 except for the above was carried out to obtain two antibody-sensitized particles having the above antibodies, respectively.

For each of the two antibody-sensitized particles obtained, the antibody sensitization efficiency was measured according to the above-mentioned method. In addition, the two antibody-sensitized particles having their respective antibodies were mixed in equal amounts. The obtained antibody-sensitized particles and the measurement results of the antibody sensitization efficiency are shown in Table 5. All particles were able to sensitize the antibodies with high antibody sensitization efficiency.

TABLE 5

| Antibody-sensitized particle | Raw material particle | Proportion of antibody used to raw material particle | Antibody sensitization efficiency (anti-PSA antibody 1) | Antibody sensitization efficiency (anti-PSA antibody 2) |
|---|---|---|---|---|
| PSSX-8-Ab200 | PSSX-8 | 200 μg/1 mg of particle | 86% | 79% |
| PSSX-9-Ab200 | PSSX-9 | 200 μg/1 mg of particle | 96% | 72% |
| PSSX-10-Ab200 | PSSX-10 | 200 μg/1 mg of particle | 89% | 77% |
| PSS-3-Ab200 | PSS-3 | 200 μg/1 mg of particle | 63% | 70% |
| PSS-18-Ab200 | PSS-18 | 200 μg/1 mg of particle | 70% | 71% |

Antibody Binding Example 4

An anti-CRP antibody was bound to the particle according to Comparative Example 1 and the particle according to Comparative Example 2. Each of the dispersion liquids prepared in Comparative Examples 1 and 2 was centrifuged at 15000 rpm (20400 g) for 20 minutes to precipitate the particle. The supernatant was removed, then a pellet of the particle was redispersed in an MES buffer solution, and a WSC solution was added thereto. Further, the anti-CRP antibody was added such that the final concentration was 100 μg/mL. The resulting mixture was stirred at room temperature for 180 minutes, and then a BSA solution was added thereto. Then, a particle coated with BSA was collected by centrifugation. The collected particle was washed using a phosphate buffer solution to obtain a particle to which the anti-CRP antibody coated with BSA was bound.

The binding of the antibody to the obtained particle was confirmed by measuring the amount of decrease in the antibody concentration of the buffer solution to which the antibody was added by the BCA assay. It was found that about 500 antibodies were bound per particle.

Immediately after the antibody was bound to the particle, it was visually confirmed that the particle agglutinated and precipitated. The particle to which the antibody was bound agglutinated and precipitated, and thus could not be used for evaluation of the latex agglutination reaction.

Antibody Binding Example 5

An anti-CRP antibody was bound to PSSZ-2 prepared in Reference Example 4. In order to obtain a thiol-reactive antibody, EMCS (N-succinimidyl 6-maleimidohexanoate) was added to an anti-CRP antibody solution to introduce a maleimide group into the antibody. A PSSZ-2 dispersion liquid was centrifuged at 15000 rpm (20400 g) for 15 minutes to precipitate PSSZ-2. The supernatant was removed, then a pellet of PSSZ-2 was redistributed using a phosphate buffer solution, and a pre-maleimidated anti-CRP antibody was added thereto. After stirring at room temperature for 180 minutes, the particle was collected by centrifugation. The collected particle was thoroughly washed with the phosphate buffer solution to obtain a fine particle to which the anti-CRP antibody was bound. The obtained particle to which the CRP antibody was bound was designated as PSSZ-2-Ab.

The binding of the antibody to PSSZ-2-Ab was confirmed by confirming, by measurement by a BCA assay, that the concentration of the antibody in the buffer solution to which the antibody was added decreased. It was found that about 100 to 500 antibodies were bound per particle. PSSZ-2-Ab was stably dispersed in the buffer solution, and did not need to be post-coated with BSA.

Antibody Binding Example 6

An anti-CRP antibody was bound to PSSZ-4 prepared in Reference Example 6. A PSSZ-4 dispersion liquid was centrifuged at 15000 rpm (20400 g) for 20 minutes to precipitate PSSZ-4. The supernatant was removed, then a pellet of PSSZ-4 was redistributed in a Tris buffer solution, and the anti-CRP antibody was added thereto such that the final concentration was 200 μg/mL. After stirring at 4° C. for 16 hours, the particle was collected by centrifugation. The collected particle was thoroughly washed with the Tris buffer solution to obtain a particle to which the anti-CRP antibody was bound. The obtained particle to which the CRP antibody was bound was designated as PSSZ-4-Ab.

The binding of the antibody to PSSZ-4-Ab was confirmed by confirming, by measurement by a BCA assay, that the concentration of the antibody in the buffer solution to which the antibody was added decreased. It was found that about 500 antibodies were bound per particle. PSSZ-4-Ab was stably dispersed in the buffer solution, and did not need to be post-coated with BSA.

<Evaluation of Non-Specific Agglutination Suppression>

60 μL of a buffer solution and 4 μL of a human serum solution were added to 30 μL of a PSS-1 particle dispersion liquid adjusted to have a concentration of 1.0% by mass and 30 μL of each of the particle dispersion liquids prepared in Examples 1 to 4, Comparative Examples 1 and 2, and Reference Examples 1 to 9, and the resulting dispersion liquids were kept warm at 37° C. for 5 minutes. The absorbance for light having a wavelength of 572 nm was measured before and after the warm keeping, the amount of change in absorbance between before and after the warm keeping was measured three times, and the average value was calculated. When the amount of change in absorbance was less than 0.1, non-specific agglutination was considered to be suppressed, and when the amount of change in absorbance was 0.1 or more, non-specific agglutination was considered to occur. Results are shown in Table 6.

In addition, as can be seen from Table 6, it was found that the particles prepared in Examples 1 to 4 and Reference Examples 1 to 9 did not agglutinate and could be stably dispersed in human serum. On the other hand, in the particles according to Comparative Examples 1 and 2, an agglutination reaction (non-specific agglutination) occurred in the reaction with human serum. It is considered that this is due to the non-specific adsorption of a protein on the surface of the fine particles and thereby the cross-linking between the particles via the adsorbed protein. When the particles according to Comparative Examples 1 and 2 were post-coated with BSA in advance, these could be stably dispersed in human serum without agglutination. It is considered that this is because albumin was adsorbed on the surface of a polystyrene particle and thereby a protein derived from human serum could not be adsorbed.

Further, the same evaluation of non-specific agglutination suppression was also carried out for the dispersion liquids of PSS-2, -3, and -9 to -18. As a result, the amount of change in absorbance was less than 0.1 in any of the polymer fine particle dispersion liquids, and no non-specific agglutination occurred.

TABLE 6

| | Particle | Non-specific agglutination suppression evaluation | |
|---|---|---|---|
| | | Change in absorbance | Presence or absence of non-specific agglutination |
| Example 1 | PSSX-1 | 0.04 | Absent |
| Example 2 | PSSX-2 | 0.06 | Absent |
| Example 3 | PSSX-3 | 0.04 | Absent |
| Example 4 | PSSX-4 | 0.05 | Absent |
| — | PSS-1 | 0.03 | Absent |
| Reference Example 1 | PSS-7 | 0.01 | Absent |
| Reference Example 2 | PSS-8 | 0.06 | Absent |
| Reference Example 3 | PSSZ-1 | 0.08 | Absent |
| Reference Example 4 | PSSZ-2 | 0.09 | Absent |
| Reference Example 5 | PSSZ-3 | 0.03 | Absent |
| Reference Example 6 | PSSZ-4 | 0.03 | Absent |
| Reference Example 7 | PSSZ-5 | 0.05 | Absent |
| Reference Example 8 | PSSZ-6 | 0.05 | Absent |
| Reference Example 9 | PSSX-17 | 0.03 | Absent |
| Comparative Example 1 | P0113 | 5000 or more | Present |
| Comparative Example 2 | P0307 | 5000 or more | Present |

<Evaluation of Latex Agglutination Reaction 1 Evaluation of Antigen Recognition Ability of Antibody-Sensitized Particles for CRP>

0.1% by mass dispersion liquids of the antibody-sensitized particles PSSX-1-Ab, PSSX-2-Ab, PSSZ-2-Ab to PSSZ-6-Ab, and PSSX-17-Ab prepared in Antibody Binding Examples 1, 5, and 6 were prepared, and a latex agglutination reaction was carried out.

Human serum-derived CRP (manufactured by Sigma-Aldrich) and each antibody-sensitized particle dispersion liquid were mixed, and the absorbance for light having a wavelength of 572 nm before and after the mixing was measured. An ultraviolet-visible spectrophotometer (trade name: GeneQuant 1300, manufactured by GE Healthcare) was used to measure the absorbance, and a sample was injected into a plastic cell and measured at an optical path length of 10 mm. If the anti-CRP antibody on the antibody-sensitized particle can capture CRP, which is an antigen, an agglutination reaction between the fine particles occurs via CRP. At this time, as a result of the occurrence of a decrease in transmittance, an increase in absorbance is observed.

First, 1 μL of 32 mg/L CRP and 50 μL of a phosphate-based buffer solution were mixed to prepare a CRP solution. Subsequently, a reaction solution in which 51 μL of the CRP solution was added to 50 μL of the antibody-sensitized particle dispersion liquid and a reaction solution in which 51 μL of the buffer solution instead of the CRP solution was added to 50 μL of the antibody-sensitized particle dispersion liquid were treated at a temperature of 37° C. for 5 minutes. The rate of change (%) in absorbance of each reaction solution before and after the treatment was measured three times, and the average value was calculated. Results are shown in Table 7.

From the results shown in Table 7, the occurrence of an agglutination reaction due to the antigen-antibody reaction when CRP was added, and the confirmation of a difference compared with the rate of change when the buffer solution was added instead of the CRP solution (without CRP) could be clearly recognized.

As can be seen from Table 7, it could be confirmed by the evaluation of the latex agglutination reaction that the antibody-sensitized particles used in the present evaluation recognized CRP and that the particles agglutinated with each other. That is, it was found that the particles prepared in Examples 1 and 2 and Reference Examples 4 to 9 can bind an antibody without using BSA and the bound antibody has an antigen recognizing ability.

From the results shown in Tables 6 and 7, it was found that particles having a scaffold capable of binding a ligand such as an antibody but having suppressed non-specific adsorption of a serum protein without using BSA could be obtained.

TABLE 7

| | Rate of change in absorbance | |
|---|---|---|
| Particle | When adding CRP solution | When adding buffer solution (without CRP) |
| PSSX-1-Ab | 40.0% | 0.5% |
| PSSX-2-Ab | 43.2% | 0.8% |
| PSSZ-2-Ab | 7.5% | −0.2% |
| PSSZ-3-Ab | 7.6% | −1.1% |
| PSSZ-4-Ab | 37.5% | 1.6% |
| PSSZ-5-Ab | 7.4% | 0.6% |
| PSSZ-6-Ab | 10.3% | −0.5% |
| PSSX-17-Ab | 38.7% | 1.2% |

<Evaluation of Latex Agglutination Reaction 2 Evaluation of Sensitivity of Antibody-Sensitized Particles to CRP>

The sensitivity of the antibody-sensitized particles prepared in Antibody Binding Example 2 was evaluated by a latex immunoagglutination method. Specifically, an antibody-sensitized particle was reacted with an antigen to form an agglutinate of an immune complex, the agglutinate was irradiated with light, and the attenuation (absorbance) of the irradiation light due to scattering was measured using an absorptiometer. The proportion of the agglutinate increases depending on the amount of the antigen included in a specimen, and the absorbance increases. In the evaluation of the sensitivity, the amount of increase in absorbance (written as ΔOD×10000) when a solution including CRP having a predetermined concentration is used is desirably large. An ultraviolet-visible spectrophotometer (trade name: GeneQuant 1300, manufactured by GE Healthcare) was used to measure the absorbance, and a sample was injected into a plastic cell and measured at an optical path length of 10 mm. The measurement method is specifically shown below.

1 μL of a CRP standard solution (CRP concentration of 5 to 160 μg/mL) and 50 μL of an R1 buffer solution (phosphate-based buffer solution) were admixed in a plastic cell and heated at 37° C. for 5 minutes. 50 μL of a dispersion solution of an antibody-sensitized particle (particle concentration of 0.1% by mass, 10 mM HEPES, pH 7.9, 0.01% by mass Tween® 20) was added to 51 μL of the R1 buffer solution including the CRP standard solution. Then, the resulting mixture was quickly pipetted while caution was used not to allow an air bubble to enter the same, to prepare a sample for measurement. The absorbance of the sample for light having a wavelength of 572 nm was read and designated as Abs1. The sample was heated at 37° C. for 5 minutes, and then the absorbance of the sample for light having a wavelength of 572 nm was read and designated as Abs2. The value obtained by subtracting Abs1 from Abs2 was determined, and the value obtained by multiplying the above value by 10000 was defined as the ΔOD×10000 value. In order to evaluate the non-specific reaction, the ΔOD× 10000 value of a sample prepared using a solution obtained by admixing 1 μL of a serum solution including no CRP (CRP concentration of 0 μg/mL) and 50 μL of the R1 buffer solution and a dispersion solution of an antibody-sensitized particle was also similarly determined.

Results are shown in Table 8. For all the antibody-sensitized particles used for the present evaluation, an increase in ΔOD×10000 was observed as the concentration of CRP increased. It was found that this was a result of the antibody-sensitized particles binding to CRP, which is an antigen, to form particle agglutinates, and that the particles function as particles for use in the latex immunoagglutination method. In addition, it was found that the antibody-sensitized particles used for the present evaluation had ΔOD×10000 of 100 or less when the CRP concentration was 0 μg/mL, and that no non-specific agglutination occurred. Further, it was shown that the antibody-sensitized particles used for the present evaluation increased the value of ΔOD×10000 by increasing the amount of the antibody sensitizing the particles.

TABLE 8

| Antibody-sensitized particle | Sensitivity (ΔOD × 10000) | | | | |
|---|---|---|---|---|---|
| | CRP concentration 0 μg/mL | CRP concentration 5 μg/mL | CRP concentration 20 μg/mL | CRP concentration 40 μg/mL | CRP concentration 160 μg/mL |
| PSSX-6-Ab50 | 20 | 440 | 2210 | 3430 | 4540 |
| PSSX-6-Ab100 | 20 | 1120 | 6360 | 11520 | 15340 |
| PSSX-6-Ab200 | −70 | 1800 | 10060 | 15340 | 14740 |
| PSSX-7-Ab50 | −10 | 290 | 1590 | 2470 | 2760 |
| PSSX-7-Ab100 | −30 | 930 | 4740 | 8100 | 12920 |
| PSSX-7-Ab200 | 10 | 2080 | 11400 | 14730 | 14050 |
| PSSX-11-Ab25 | 40 | 170 | 160 | 100 | 170 |
| PSSX-11-Ab50 | 80 | 280 | 590 | 620 | 530 |
| PSSX-11-Ab100 | 0 | 330 | 940 | 1120 | 930 |
| PSSX-12-Ab25 | 20 | 420 | 1270 | 1610 | 1470 |
| PSSX-12-Ab50 | −160 | 600 | 3010 | 4800 | 6900 |
| PSSX-12-Ab100 | −20 | 780 | 5250 | 11030 | 16230 |
| PSSX-13-Ab25 | −30 | 480 | 1630 | 2120 | 1970 |
| PSSX-13-Ab50 | −50 | 710 | 3630 | 6200 | 8520 |
| PSSX-13-Ab100 | 0 | 950 | 6840 | 14720 | 15710 |

<Evaluation of Latex Agglutination Reaction 3 Evaluation of Sensitivity of Antibody-Sensitized Particles to Human PSA>

For the antibody-sensitized particles prepared in Antibody Binding Example 3, the sensitivity to PSA was evaluated according to the method described in Evaluation of latex agglutination reaction 2.

Specifically, 16 μL of a PSA standard solution (PSA concentration of 91.7 ng/mL) and 60 μL of an R1 buffer solution were admixed in a plastic cell and heated at 37° C. for 5 minutes. 30 μL of a dispersion solution of an antibody-sensitized particle (particle concentration of 0.2% by mass) was added to the R1 buffer solution (76 μL) including the PSA standard solution, and the resulting mixture was quickly pipetted while caution was used not to allow an air bubble to enter the same, to prepare a sample for measurement. The absorbance of the sample for light having a wavelength of 572 nm was read and designated as Abs3. The sample was heated at 37° C. for 5 minutes, and then the absorbance of the sample for light having a wavelength of 572 nm was read and designated as Abs4. The value obtained by subtracting Abs3 from Abs4 was determined, and the value obtained by multiplying the above value by 10000 was defined as the ΔOD×10000 value. In order to evaluate the non-specific reaction, the ΔOD×10000 value of a sample prepared using a solution obtained by admixing 1 μL of a serum solution including no PSA (CRP concentration of 0 ng/mL) and 50 μL of the R1 buffer solution and a dispersion solution of an antibody-sensitized particle was also similarly determined.

Results are shown in Table 9. For all the antibody-sensitized particles used for the present evaluation, an increase in ΔOD×10000 was observed in the presence of PSA. It was found that this was a result of the antibody-sensitized particles binding to PSA, which is an antigen, to form particle agglutinates, and that the particles function as particles for use in the latex immunoagglutination method. In addition, it was found that the antibody-sensitized particles used for this evaluation had ΔOD×10000 of 100 or less when the PSA concentration was 0 ng/mL, and that no non-specific agglutination occurred.

TABLE 9

| Antibody-sensitized particle | ΔOD × 10000 | |
|---|---|---|
| | PSA concentration 91.7 ng/mL | PSA concentration 0 ng/mL |
| PSSX-8-Ab200 | 4900 | −110 |
| PSSX-9-Ab200 | 5290 | −130 |
| PSSX-10-Ab200 | 4750 | 70 |
| PSS-3-Ab200 | 3290 | −60 |
| PSS-18-Ab200 | 3920 | 30 |

[Example 17] Evaluation of Non-Specific Agglutination Suppressing Performance of PSSX-1 for Albumin As an evaluation of the non-specific agglutination suppressing performance of PSSX-1 obtained in Example 1, non-specific agglutination for albumin was confirmed. First, 50 μL of a 0.1% by mass aqueous dispersion of PSSX-1 and 50 μL of a 0.05% or 0.5% bovine serum albumin solution (bovine serum albumin dissolved in phosphate buffered saline) were mixed, and the resulting mixture was kept warm at 37° C. for 5 minutes. The absorbance at 572 nm was measured before and after the warm keeping, and the amount of change in absorbance between before and after the warm keeping was measured. When non-specific agglutination occurs for albumin, the value of the amount of change in absorbance×10000 is 1000 or more.

Numerical values of the amount of change in absorbance× 10000 are shown below.

0.05% Albumin solution: 20
0.5% Albumin solution: 80

From the above results, it became clear that PSSX-1 is not agglutinated by albumin.

[Example 18] Evaluation of Non-Specific Agglutination Suppressing Performance of PSSX-1 for Human Serum Globulin Fraction As an evaluation of the non-specific agglutination suppressing performance of PSSX-1 obtained in Example 1, non-specific agglutination for a human serum globulin fraction was confirmed. First, 16 μL of a globulin solution having a globulin concentration of 0.48 mg/mL or 48 mg/mL was added to 60 μL of a phosphate buffer solution, and the resulting mixture was incubated at 37° C. for 5 minutes. Then, 30 μL of a 0.1% by mass aqueous dispersion of PSSX-1 was added thereto, and the mixture was kept warm at 37° C. for 5 minutes. The absorbance at 572 nm was measured before and after the warm keeping, and the amount of change in absorbance between before and after the warm keeping was measured. When non-specific agglutination occurs for a human serum globulin fraction, the value of the amount of change in absorbance×10000 is 1000 or more.

Values of the amount of change in absorbance×10000 are shown below.

Globulin concentration of 0.48 mg/mL: 0
Globulin concentration of 48 mg/mL: 60

From the above results, it became clear that PSSX-1 is not agglutinated by a human serum globulin fraction.

[Example 19] Evaluation of Non-Specific Agglutination Suppressing Performance of PSSX-1 for Human Serum Fibrin As an evaluation of the non-specific agglutination suppressing performance of PSSX-1 obtained in Example 1, non-specific agglutination for human serum fibrin was confirmed. First, 50 µL of a 0.1% by mass aqueous dispersion of PSSX-1 and 50 µL of a human serum fibrin solution (prepared just before use) were mixed, and the resulting mixture was kept warm at 37° C. for 5 minutes. As a result of visually observing the agglutination of the particle after the warm keeping, no particle agglutination was observed.

From the above results, it became clear that PSSX-1 is not agglutinated by human serum fibrin.

[Example 20] Synthesis and Evaluation of Particles Having Different Particle Sizes The amount of each material used in the preparation of PSS-2 and PSS-4 was changed as shown in Table 10, and polystyrene-silica hybrid fine particles were obtained in the same manner as in PSS-2 and PSS-4 except for the above. The obtained particles were designated as PSSX-18 to PSSX-33, respectively. The particle sizes and dispersibility of the particles are shown in Table 10. By changing the formulation, a particle size in the range of 93.1 nm to 423.2 nm could be controlled. When the particle size exceeded 340 nm, it was observed that the dispersibility of the particles in water tended to deteriorate.

TABLE 10

| Particle | Preparation conditions for polystyrene-silica hybrid fine particle | | | | | | |
|---|---|---|---|---|---|---|---|
| | Amount of styrene used (g) | Amount of 3-methacryloxypropyl-trimethoxysilane used (g) | Amount of potassium peroxodisulfate used | Amount of sodium parastyrenesulfonate used | Amount of PVP K-30 used (g) | Amount of buffer solution used (g) | Particle size of fine particle (nm) |
| PSSX-18 | 12.9 | 4.1 | 0.50 | 0.3 | 1.3 | 25 mM MES (pH 7.0) 157.5 | 92.8 |
| PSSX-19 PSSX-20 PSSX-21 | 6.4 | 2.0 | 0.50 | 0.1 | 2.0 | 50 mM MES (pH 7.0) 157.5 | 97.1 |
| PSSX-22 PSSX-23 PSSX-24 PSSX-25 | 12.9 | 4.1 | 0.03 | 0 | 1.3 | 5 mM MES (pH 7.0) 157.5 | 318.5 |
| PSSX-26 | 3.2 | 1.0 | 0.50 | 0 | 1.3 | 100 mM MES (pH 7.0) 157.5 | 113.0 |
| PSSX-27 PSSX-28 PSSX-29 | 3.2 | 1.0 | 0.50 | 0 | 1.3 | 100 mM MES (pH 7.0) 157.5 | 115.9 |
| PSSX-30 | 12.9 | 4.1 | 0.40 | 0 | 1.3 | 50 mM MES (pH 7.0) 157.5 | 177.9 |
| PSSX-31 PSSX-32 PSSX-33 | 12.9 | 4.1 | 0.03 | 0 | 1.3 | 5 mM MES (pH 7.0) 157.5 | 285.5 |

| Particle | Conditions for reaction with silane coupling agent | | | | | Values of physical properties of particle | |
|---|---|---|---|---|---|---|---|
| | Amount of polystyrene-silica hybrid fine particle used (g) | Amount of X-12-1135 silane coupling agent used (mL) | Amount of 10% Tween 20 used (mL) | Amount of ion exchanged water used (g) | Amount of buffer solution used (mL) | Particle size (nm) | Dispersibility |
| PSSX-18 | 1 | 2 | 30 | 256.8 | 500 mM MES (pH 7.0) 0.6 | 93.1 | Good |
| PSSX-19 | 1 | 2 | 30 | 251.6 | Not used Not used | 112.8 | Good |
| PSSX-20 | 0.5 | 1 | 15 | 120.3 | Not used Not used | 102.1 | Good |
| PSSX-21 | 0.5 | 2 | 15 | 119.3 | Not used Not used | 99.1 | Good |
| PSSX-22 | 0.5 | 2 | 15 | 129.6 | Not used Not used | 423.2 | Loosely agglutinated |
| PSSX-23 | 0.5 | 0.1 | 15 | 131.5 | Not used Not used | 314.5 | Good |
| PSSX-24 | 0.5 | 0.5 | 15 | 131.1 | Not used Not used | 353.4 | Good |
| PSSX-25 | 0.5 | 1 | 15 | 130.6 | Not used Not used | 384.2 | Loosely agglutinated |
| PSSX-26 | 0.36 | 0.36 | 10.9 | 91.1 | Not used Not used | 120.5 | Good |
| PSSX-27 | 0.5 | 0.1 | 15 | 125.3 | Not used Not used | 110.0 | Good |
| PSSX-28 | 0.5 | 0.25 | 15 | 125.2 | Not used Not used | 120.0 | Good |
| PSSX-29 | 0.5 | 0.5 | 15 | 126.5 | Not used Not used | 118.0 | Good |
| PSSX-30 | 0.5 | 0.0465 | 15 | 128.4 | Not used Not used | 206.6 | Good |
| PSSX-31 | 0.5 | 0.034875 | 15 | 129.8 | Not used Not used | 280.3 | Good |

TABLE 10-continued

| | | | | | | | | |
|---|---|---|---|---|---|---|---|---|
| PSSX-32 | 0.5 | 0.06975 | 15 | 129.7 | Not used | Not used | 287.5 | Good |
| PSSX-33 | 0.5 | 0.16275 | 15 | 129.6 | Not used | Not used | 343.0 | Loosely agglutinated |

[Example 21] Measurement of Amount of COOH of Particles and Evaluation of Non-Specific Reaction Suppression The amount of particle surface COOH of PSSX-23, PSSX-24, and PSSX-26 to PSSX-33 obtained in Example 8 and the non-specific reaction suppressing ability of the particles were evaluated. Results are shown in Table 11. By changing the formulation, an amount of COOH of 18 nmol/mg to 334 nmol/mg could be controlled. As a result of adding human serum to these particle solutions, the amount of change in absorbance was less than 1000, which is an indicator of the absence of a non-specific reaction, and thus no non-specific reaction was observed for human serum.

TABLE 11

| | Values of physical properties of particle | | Non-specific reaction suppressing ability of particle |
|---|---|---|---|
| Particle | Particle size (nm) | Amount of COOH (nmol/mg) | Amount of change in absorbance (ΔOD × 10000) |
| PSSX-23 | 314.5 | 33 | −20 |
| PSSX-24 | 353.4 | 180 | −190 |
| PSSX-26 | 120.5 | 334 | 80 |
| PSSX-27 | 110.0 | 47 | 20 |
| PSSX-28 | 120.0 | 72 | 100 |
| PSSX-29 | 118.0 | 253 | 30 |
| PSSX-30 | 206.6 | 18 | 20 |
| PSSX-31 | 280.3 | 25 | −10 |
| PSSX-32 | 287.5 | 63 | 90 |
| PSSX-33 | 343.0 | 153 | 140 |

According to the present invention, a particle that can suppress non-specific adsorption without using BSA and a method for producing the same can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A particle comprising:

a copolymer comprising a repeating unit represented by formula (I) and a repeating unit represented by formula (II); and a structural unit represented by formula (III):

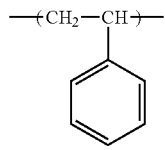

(I)

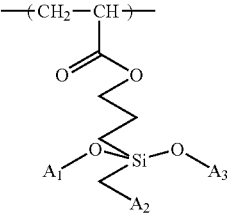

(II)

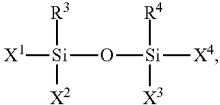

(III)

wherein, in the formula (II), $A_1$ to $A_3$ are each independently any of —H, —$CH_3$, —$CH_2CH_3$, a bond that bonds to Si in the formula (II) via —O—, and a bond to Si in the formula (III), wherein, in the formula (III), $X^1$ to $X^4$ each independently represent a bond including —O— binding to Si of an adjacent structure represented by the formula (III), a bond with O bonded to Si in the formula (II), a hydroxy group, or a bond with the copolymer, wherein at least one of structural units represented by the formula (III) has a bond with the copolymer, and $R^3$ and $R^4$ each independently represent a linear or branched alkyl group having 1 to 30 carbon atoms that optionally includes —NH—CO—, —NH—, —O—, —S—, or —CO—, and substituted with at least one carboxy group or at least one amino group, and wherein the copolymer further comprises a repeating unit represented by formula (IV):

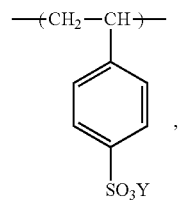

(IV)

wherein Y is any of H, Na, and K.

2. A particle comprising:

a copolymer comprising a repeating unit represented by formula (I) and a repeating unit represented by formula (II); and a structural unit represented by formula (III):

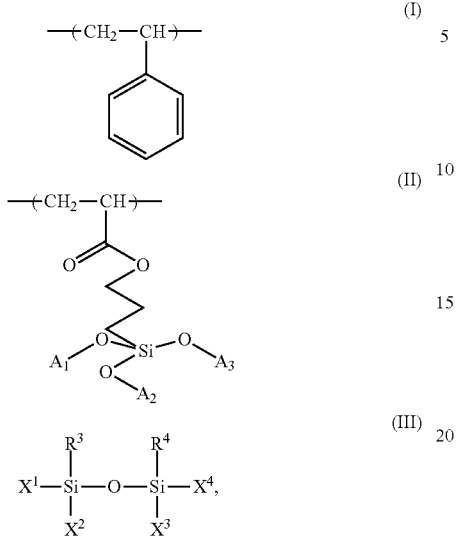

wherein, in the formula (II), $A_1$ to $A_3$ are each independently any of —H, —$CH_3$, —$CH_2CH_3$, a bond that bonds to Si in the formula (II) via —O—, and a bond to Si in the formula (III), wherein, in the formula (III), $X^1$ to $X^4$ each independently represent a bond including —O— binding to Si of an adjacent structure represented by the formula (III), a bond with O bonded to Si in the formula (II), a hydroxy group, or a bond with the copolymer, wherein at least one of structural units represented by the formula (III) has a bond with the copolymer, and $R^3$ and $R^4$ each independently represent a linear or branched alkyl group having 1 to 30 carbon atoms that optionally includes —NH—CO—, —NH—, —O—, —S—, or —CO—, and substituted with at least one carboxy group or at least one amino group, and wherein at least one of $R^3$ and $R^4$ in the formula (III) is represented by formula (3):

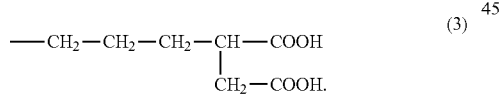

3. A particle comprising:
a copolymer comprising a repeating unit represented by formula (I) and a repeating unit represented by formula (II); and
a structural unit represented by formula (III):

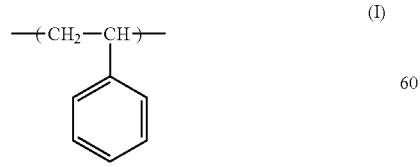

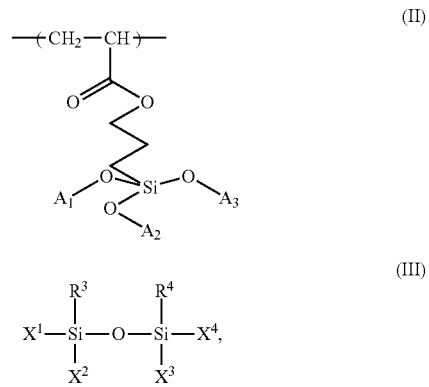

wherein, in the formula (II), $A_1$ to $A_3$ are each independently any of —H, —$CH_3$, —$CH_2CH_3$, a bond that bonds to Si in the formula (II) via —O—, and a bond to Si in the formula (III), wherein, in the formula (III), $X^1$ to $X^4$ each independently represent a bond including —O— binding to Si of an adjacent structure represented by the formula (III), a bond with O bonded to Si in the formula (II), a hydroxy group, or a bond with the copolymer, wherein at least one of structural units represented by the formula (III) has a bond with the copolymer, and $R^3$ and $R^4$ each independently represent a linear or branched alkyl group having 1 to 30 carbon atoms that optionally includes —NH—CO—, —NH—, —O—, —S—, or —CO—, and substituted with at least one carboxy group or at least one amino group, wherein the copolymer further comprises a repeating unit represented by formula (IV):

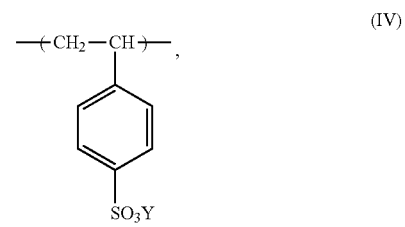

wherein Y is any of H, Na, and K, and wherein at least one of $R^3$ and $R^4$ in the formula (III) is represented by formula (3):

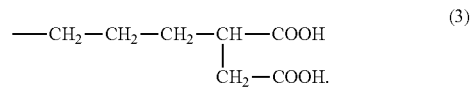

* * * * *